United States Patent
Wang et al.

(10) Patent No.: US 11,916,820 B2
(45) Date of Patent: Feb. 27, 2024

(54) REFERENCE SIGNAL CONFIGURATION, INFORMATION TRANSMISSION, AND INFORMATION RECEIVING METHODS AND DEVICE

(71) Applicant: ZTE CORPORATION, Shenzhen (CN)

(72) Inventors: Yuxin Wang, Shenzhen (CN); Shujuan Zhang, Shenzhen (CN); Zhaohua Lu, Shenzhen (CN); Yu Ngok Li, Shenzhen (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 953 days.

(21) Appl. No.: 16/646,345

(22) PCT Filed: Sep. 7, 2018

(86) PCT No.: PCT/CN2018/104696
§ 371 (c)(1),
(2) Date: Jul. 17, 2020

(87) PCT Pub. No.: WO2019/047940
PCT Pub. Date: Mar. 14, 2019

(65) Prior Publication Data
US 2023/0198699 A1  Jun. 22, 2023

(51) Int. Cl.
*H04L 47/10* (2022.01)
*H04L 47/30* (2022.01)
(Continued)

(52) U.S. Cl.
CPC .................. *H04L 5/0048* (2013.01)

(58) Field of Classification Search
CPC ............... H04L 5/0048; H04L 25/0226; H04L 5/001; H04L 5/0094; H04L 5/0051
(Continued)

(56) References Cited

U.S. PATENT DOCUMENTS 10,567,201 B2 * 2/2020 Wang ..................... H04B 1/713
2012/0063426 A1  3/2012 Noh et al.
(Continued)

FOREIGN PATENT DOCUMENTS

CN 101827444 A 9/2010
CN 101917765 A 12/2010
(Continued)

OTHER PUBLICATIONS

Chinese First Search Report, App No. 201710813799X, dated Sep. 22, 2022, pp. 1-3.
(Continued)

*Primary Examiner* — Maharishi V Khirodhar
(74) *Attorney, Agent, or Firm* — George R. McGuire

(57) ABSTRACT

Disclosed are a reference signal configuration method and device, an information transmission method and device, and an information receiving method and device. The reference signal configuration method includes: indicating, by a first communication node, via signaling a resource used by a second communication node for transmitting a reference signal; or predefining, by a first communication node and a second communication node, a resource used by the second communication node for transmitting a reference signal. Further disclosed are a storage medium and a processor.

15 Claims, 6 Drawing Sheets

(51) Int. Cl.
  *H04L 47/11* (2022.01)
  *H04L 47/12* (2022.01)
  *H04L 5/00* (2006.01)

(58) Field of Classification Search
  USPC ............................................. 370/329
  See application file for complete search history.

(56) References Cited

U.S. PATENT DOCUMENTS

| | | | |
|---|---|---|---|
| 2012/0176977 A1* | 7/2012 | Gao | H04L 5/0091 |
| | | | 370/329 |
| 2013/0156014 A1* | 6/2013 | Kim | H04W 72/20 |
| | | | 370/336 |
| 2015/0304994 A1 | 10/2015 | Kim | |
| 2019/0014588 A1 | 1/2019 | Kishiyama et al. | |
| 2019/0053103 A1* | 2/2019 | Manolakos | H04L 5/0048 |
| 2021/0037505 A1* | 2/2021 | Kim | H04L 5/0044 |
| 2021/0127358 A1* | 4/2021 | Li | H04W 56/001 |

FOREIGN PATENT DOCUMENTS

| | | |
|---|---|---|
| CN | 102014506 A | 4/2011 |
| CN | 10240854 A | 4/2012 |
| CN | 102404854 A | 4/2012 |
| CN | 103782640 A | 5/2014 |
| CN | 103944665 A | 7/2017 |
| CN | 108111280 A | 6/2018 |
| EP | 2528400 A1 | 11/2012 |
| EP | 2696626 A1 | 2/2014 |
| WO | 2015022388 A1 | 2/2015 |
| WO | 2017150448 A1 | 9/2017 |

OTHER PUBLICATIONS

Supplemental Partial European Search Report, dated Apr. 7, 2021. pp. 1-17.
International Search Report and Written Opinion Form PCT/ISA/210 and PCT/ISA237, International Application No. PCT/CN2018/104696, pp. 1-6, International Filing Date Sep. 7, 2018, dated search report Nov. 29, 2018.

* cited by examiner

REFERENCE SIGNAL CONFIGURATION, INFORMATION TRANSMISSION, AND INFORMATION RECEIVING METHODS AND DEVICE

CROSS-REFERENCES TO RELATED APPLICATIONS

This application is a national stage application under 35 U.S.C. 371 based on international patent application PCT/CN2018/104696, filed on Sep. 7, 2018 which based on and claims priority to Chinese patent application No. 201710813799.X filed on Sep. 11, 2017, disclosures of which are incorporated herein by reference in their entireties.

TECHNICAL FIELD

The present disclosure relates to the field of communications and in particular, to a reference signal configuration method and device, an information transmission method and device, an information receiving method and device, a storage medium, and a processor.

BACKGROUND

In the related art, in the Long Term Evolution (LTE), a physical downlink control channel (PDCCH) is used for carrying uplink and downlink scheduling information and uplink power control information. A downlink control information (DCI) format includes DCI formats 1, 1A, 1B, 1 C, 1D, 2, 2A, 3, 3A, etc. In advanced LTE (LTE-A) Release 12, DCI formats 2B, 2C, and 2D are added to support a variety of different applications and transmission modes. A first communication node (an e-Node-B (eNB)) may configure a second communication node (a user equipment (UE)) through downlink control information, or the second communication node receives a configuration by higher layers, which is also referred to as being configured via higher-layer signaling.

A sounding reference signal (SRS) is a signal used between the second communication node and the first communication node for measuring channel state information (CSI). In the LTE system, the UE periodically transmits an uplink SRS on the last data symbol of a transmission subframe according to parameters indicated by the eNB, such as a frequency band, a frequency domain position, a sequence cyclic shift, a period, and a subframe offset. The eNB determines uplink CSI of the UE according to the received SRS, and performs operations such as frequency domain selection scheduling and closed loop power control according to the obtained CSI.

A study of LTE-A Release 10 proposes that in an uplink communication, a non-precoded SRS, that is, an antenna-specific SRS, should be used, while a de modulation reference signal (DMRS) for a physical uplink shared channel (PUSCH) is precoded. The first communication node can estimate uplink original CSI by receiving the non-precoded SRS, and cannot estimate the uplink original CSI through the precoded DMRS. In this case, when the UE transmits the non-precoded SRS by using multiple antennas, SRS resources required by each UE will increase, which results in a decrease in the number of UEs capble of being multiplexed simultaneously in the system. The UE may transmit the SRS through two triggering manners, that is, through the higher-layer signaling (also referred to as trigger type 0) or the downlink control information (also referred to as trigger type 1). The triggering manner based on the higher-layer signaling is a periodic SRS, and the triggering manner based on the downlink control information is an aperiodic SRS. In LTE-A Release 10, a manner of an aperiodic transmission of the SRS is added, which improves the utilization rate of SRS resources to some extent and improves the flexibility of resource scheduling.

With the development of communication technologies, an increased amount of data traffic is required and available low-frequency carriers are in short supply. Therefore, a high-frequency (30 to 300 GHz) carrier communication which has not been fully utilized becomes an important communication way of achieving high-speed data communications in the future. The high-frequency carrier communication has a large available bandwidth and can provide effective high-speed data communications. However, a big technical challenge for the high-frequency carrier communication is that high-frequency signals are attenuated significantly in space compared with low-frequency signals. Although this will cause spatial attenuation losses when the high-frequency signals are used for an outdoor communication, it generally allows more antennas to be used that the wavelength of the high-frequency signals decreases. Therefore, a beam-based communication may be performed to compensate for the spatial attenuation losses.

However, when the number of antennas increases, each antenna needs a set of radio links, and digital beamforming thus brings about an increase in costs and a loss in power. Therefore, current studies tend to hybrid beamforming, that is, a final beam formed by a radio frequency beam and a digital beam.

In a study of a new radio access technology (NR), in a high-frequency communication system, the first communication node will configure a large number of antennas to form downlink transmission beams for compensating for the spatial attenuation of the high-frequency communication, and the second communication node will also configure a large number of antennas to form uplink transmission beams. At this time, the SRS will also be transmitted in the form of beams. In a study of the future new radio access technology, a base station may configure different bandwidth parts (BWPs) for users, and the bandwidth occupied by the BWP of the users may be larger than the 20 MHz bandwidth of the LTE/LTE-A system. However, a current SRS bandwidth configuration only supports a maximum bandwidth of 20 MHz. Therefore, the SRS bandwidth configuration needs to be expanded or an SRS bandwidth configuration scheme needs to be newly designed in the NR, so as to meet design requirements of the NR.

A solution has not been proposed for the problem in the related art of a defective technical scheme of transmitting a reference signal.

SUMMARY

Embodiments of the present disclosure provide a reference signal configuration method and device, an information transmission method and device, an information receiving method and device, a storage medium, and a processor, so as to solve at least the problem in the related art of a defective technical scheme of transmitting a reference signal.

An embodiment of the present disclosure provides a reference signal configuration method. The method includes a step described below.

A first communication node indicates, via signaling, a resource used by a second communication node for transmitting a reference signal.

Alternatively, a first communication node and a second communication node predefine a resource used by the second communication node for transmitting a reference signal.

Another embodiment of the present disclosure further provides a reference signal configuration method. The method includes a step described below.

A second communication node determines a resource used by a reference signal via signaling transmitted by a first communication node.

Alternatively, a second communication node and a first communication node predefine a resource used for transmitting a reference signal.

Another embodiment of the present disclosure further provides an information transmission method. The method includes steps described below.

First information is determined.

Resource request information of a first reference signal or capability information is determined according to the first information.

The resource request information of the first reference signal or the capability information is transmitted.

The first information includes information about a second signal, and the first reference signal and the second signal have different transmission directions.

Another embodiment of the present disclosure further provides an information receiving method. The method includes steps described below.

Signaling information is transmitted, where the signaling information is used for instructing a second communication node to transmit resource request information of a first reference signal or capability information.

The resource request information of the first reference signal or the capability information transmitted by the second communication node is received.

The signaling information carries first information, the first information includes information about a second signal, and the first reference signal and the second signal have different transmission directions.

Another embodiment of the present disclosure further provides a reference signal configuration device. The device includes an indication module or a first predefinition module.

The indication module is configured to indicate, via signaling, a resource used by a second communication node for transmitting a reference signal.

The first predefinition module is configured to predefine, with a second communication node, a resource used by the second communication node for transmitting a reference signal.

Another embodiment of the present disclosure further provides a reference signal configuration device. The device includes a first determining module or a second predefinition module.

The first determining module is configured to determine a resource used by a reference signal via signaling transmitted by a first communication node.

The second predefinition module is configured to predefine, with a first communication node, a resource used for transmitting a reference signal.

Another embodiment of the present disclosure further provides an information transmission device. The device includes a second determining module, a third determining module, and a first transmitting module.

The second determining module is configured to determine first information.

The third determining module is configured to determine resource request information of a first reference signal or capability information according to the first information.

The first transmitting module is configured to transmit the resource request information of the first reference signal or the capability information.

The first information includes information about a second signal, and the first reference signal and the second signal have different transmission directions.

Another embodiment of the present disclosure further provides an information receiving device. The device includes a second transmitting module and a receiving module.

The second transmitting module is configured to transmit signaling information, where the signaling information is used for instructing a second communication node to transmit resource request information of a first reference signal or capability information.

The receiving module is configured to receive the resource request information of the first reference signal or the capability information transmitted by the second communication node.

The signaling information carries first information, the first information includes information about a second signal, and the first reference signal and the second signal have different transmission directions.

Another embodiment of the present disclosure further provides a storage medium. The storage medium includes stored programs which, when executed, perform the method according to any one of the embodiments described above.

Another embodiment of the present disclosure further provides a processor. The processor is configured to execute programs which, when executed, perform the method according to any one of the embodiments described above.

According to the embodiments of the present disclosure, the first communication node indicates, via the signaling, the resource used by the second communication node for transmitting the reference signal, or the first communication node and the second communication node predefine the resource used by the second communication node for transmitting the reference signal, solving the problem in the related art of the defective technical scheme of transmitting the reference signal, improving a reference signal transmission method, and improving user experience.

BRIEF DESCRIPTION OF DRAWINGS

The drawings described herein are used for providing a further understanding of the present disclosure, and form a part of the present application. The exemplary embodiments and descriptions thereof in the present disclosure are used for explaining the present disclosure, and do not form any improper limit to the present disclosure. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and above drawings of the present disclosure are used to distinguish between similar objects and are not necessarily used to describe a particular order or sequence.

Embodiment One

Figure 1:
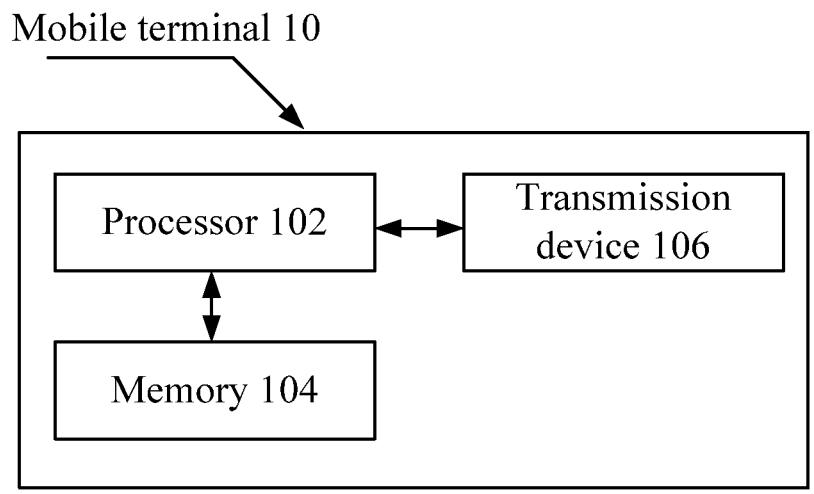
FIG. 1 is a block diagram of a hardware structure of a mobile terminal for a reference signal configuration method according to an embodiment of the present disclosure.

A method embodiment provided by embodiment one of the present application may be executed in a mobile terminal, a computer terminal or other similar computing devices. A method embodiment to be executed in the mobile terminal is used as an example. FIG. 1 is a block diagram of a hardware structure of a mobile terminal for a reference signal configuration method according to an embodiment of the present disclosure. As shown in FIG. 1, a mobile terminal 10 may include one or two (only one is shown in FIG. 1) processors 102 (the processor 102 may include, but is not limited to, a processing device such as a micro controller unit (MCU) or a field-programmable gate array (FPGA)), a memory 104 used for storing data, and a transmission device 106 used for implementing a communication function. It may be understood by those skilled in the art that the structure shown in FIG. 1 is only illustrative, and not intended to limit the structure of the electronic device described above. For example, the mobile terminal 10 may further include more or fewer components than the components shown in FIG. 1, or may have a configuration different from the configuration shown in FIG. 1.

The memory 104 may be configured to store software programs and modules of application software, such as program instructions/modules corresponding to the data transmission method in the embodiments of the present disclosure. The processor 102 executes the software programs and modules stored in the memory 104 to perform various functional applications and data processing, that is, to implement the method described above. The memory 104 may include a high-speed random access memory, and may further include a nonvolatile memory such as one or two magnetic storage devices, flash memories or other nonvolatile solid-state memories. In some examples, the memory 104 may further include memories that are remotely disposed with respect to the processor 102. These remote memories may be connected to the mobile terminal 10 via a network. Examples of the above network include, but are not limited to, the Internet, an intranet, a local area network, a mobile communication network, and a combination thereof.

The transmission device 106 is configured to receive or transmit data via a network. Specific examples of the above network may include a wireless network provided by a communication provider of the mobile terminal 10. In one example, the transmission device 106 includes a network interface controller (NIC), which may be connected to other network equipment via a base station and thus is capable of communicating with the Internet. In one example, the transmission device 106 may be a radio frequency (RF) module, which is used for communicating with the Internet in a wireless way.

Figure 2:
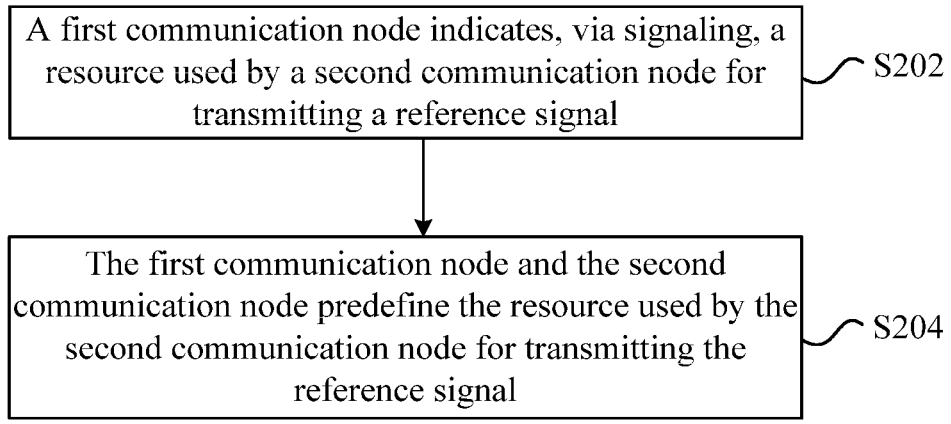
FIG. 2 is flowchart one of a reference signal configuration method according to an embodiment of the present disclosure.

An embodiment of the present disclosure provides a reference signal configuration method. FIG. 2 is flowchart one of a reference signal configuration method according to an embodiment of the present disclosure. As shown in FIG. 2, the method includes step S202 or step S204.

In the step S202, a first communication node indicates, via signaling, a resource used by a second communication node for transmitting a reference signal.

In the step S204, the first communication node and the second communication node predefine the resource used by the second communication node for transmitting the reference signal.

Optionally, the resource includes at least one of a frequency domain starting position, a transmission bandwidth, a bandwidth configuration, or a time domain position.

Optionally, the step in which the first communication node and the second communication node predefine the resource used by the second communication node for transmitting the reference signal includes steps described below:

the first communication node determines a transmission bandwidth set of the reference signal according to a range of a bandwidth part configured for the second communication node;

the first communication node determines the bandwidth configuration of the reference signal according to the range of the bandwidth part configured for the second communication node;

the first communication node determines a transmission bandwidth range or the transmission bandwidth set of the reference signal according to the bandwidth configuration of the reference signal; or the first communication node determines the transmission bandwidth of the reference signal according to a parameter of the transmission bandwidth of the reference signal configured for the second communication node.

Optionally, the step in which the first communication node determines the transmission bandwidth set of the reference signal according to the range of the bandwidth part configured for the second communication node includes at least one of steps described below:

in response to determining that the range of the bandwidth part is greater than 0 and less than or equal to 4 physical resource blocks, the first communication node determines that the transmission bandwidth set of the reference signal includes 4;

in response to determining that the range of the bandwidth part is greater than 4 and less than or equal to 8 physical resource blocks or the range of the bandwidth part is less than or equal to 8 physical resource blocks, the first communication node determines that the transmission bandwidth set of the reference signal includes at least one of 4 or 8;

in response to determining that the range of the bandwidth part is greater than 8 and less than or equal to 16 physical resource blocks, the first communication node determines that the transmission bandwidth set of the reference signal includes at least one of 4, 8, or 16;

in response to determining that the range of the bandwidth part is greater than 16 and less than or equal to 32 physical resource blocks, the first communication node determines that the transmission bandwidth set of the reference signal includes at least one of 4, 8, 16, or 32;

in response to determining that the range of the bandwidth part is greater than 32 and less than or equal to 64 physical resource blocks, the first communication node determines that the transmission bandwidth set of the reference signal includes at least one of 4, 8, 16, 32, or 64;

in response to determining that the range of the bandwidth part is greater than 64 and less than or equal to 128 physical resource blocks, the first communication node determines that the transmission bandwidth set of the reference signal includes at least one of 4, 8, 16, 32, 64, or 128; or in response to determining that the range of the bandwidth part is greater than 128 and less than or equal to 256 physical resource blocks, the first communication node determines that the transmission bandwidth set of the reference signal includes at least one of 4, 8, 16, 32, 64, 128, or 256;

where a unit of an element in the transmission bandwidth set is a physical resource block.

Optionally, the step in which the first communication node determines the bandwidth configuration of the reference signal according to the range of the bandwidth part configured for the second communication node includes at least one of steps described below:

in response to determining that the range of the bandwidth part is greater than 0 and less than or equal to 4 physical resource blocks, or the range of the bandwidth part is greater than 0 and less than or equal to 8 physical resource blocks, the first communication node determines the bandwidth configuration of the reference signal to be 0;

in response to determining that the range of the bandwidth part is greater than 4 and less than or equal to 8 physical resource blocks, the first communication node determines the bandwidth configuration of the reference signal to be 1;

in response to determining that the range of the bandwidth part is greater than 8 and less than or equal to 16 physical resource blocks, the first communication node determines the bandwidth configuration of the reference signal to be 2;

in response to determining that the range of the bandwidth part is greater than 16 and less than or equal to 32 physical resource blocks, the first communication node determines the bandwidth configuration of the reference signal to be 3;

in response to determining that the range of the bandwidth part is greater than 32 and less than or equal to 64 physical resource blocks, the first communication node determines the bandwidth configuration of the reference signal to be 4;

in response to determining that the range of the bandwidth part is greater than 64 and less than or equal to 128 physical resource blocks, the first communication node determines the bandwidth configuration of the reference signal to be 5; or in response to determining that the range of the bandwidth part is greater than 128 and less than or equal to 256 physical resource blocks, the first communication node determines the bandwidth configuration of the reference signal to be 6.

Optionally, the step in which the first communication node determines the bandwidth configuration of the reference signal according to the range of the bandwidth part configured for the second communication node includes at least one of steps described below:

in response to determining that the range of the bandwidth part is greater than 128 and less than or equal to 256 physical resource blocks, the first communication node determines the bandwidth configuration of the reference signal to be 0;

in response to determining that the range of the bandwidth part is greater than 64 and less than or equal to 128 physical resource blocks, the first communication node determines the bandwidth configuration of the reference signal to be 1;

in response to determining that the range of the bandwidth part is greater than 32 and less than or equal to 64 physical resource blocks, the first communication node determines the bandwidth configuration of the reference signal to be 2;

in response to determining that the range of the bandwidth part is greater than 16 and less than or equal to 32 physical resource blocks, the first communication node determines the bandwidth configuration of the reference signal to be 3;

in response to determining that the range of the bandwidth part is greater than 8 and less than or equal to 16 physical resource blocks, the first communication node determines the bandwidth configuration of the reference signal to be 4;

in response to determining that the range of the bandwidth part is greater than 4 and less than or equal to 8 physical resource blocks or the range of the bandwidth part is greater than 0 and less than or equal to 8 physical resource blocks, the first communication node determines the bandwidth configuration of the reference signal to be 5; or in response to determining that the range of the bandwidth part is greater than 0 and less than or equal to 4 physical resource blocks, the first communication node determines the bandwidth configuration of the reference signal to be 6.

Optionally, the step in which the first communication node determines the transmission bandwidth of the reference signal according to the parameter of the transmission bandwidth of the reference signal configured for the second communication node includes one of equations described below:

$$m_{SRS,i} = 4 * \text{ceil}\left(\frac{N_{BWP}/4}{2^{B_{SRS}}}\right); \quad (1)$$

$$m_{SRS,i} = 4 * \text{ceil}\left(\frac{N_{BWP}/4}{2^i}\right); \quad (2)$$

$$m_{SRS,i} = 4 * \text{floor}\left(\frac{N_{BWP}/4}{2^{B_{SRS}}}\right); \quad (3)$$

-continued $$m_{SRS,i} = 4 * \text{floor}\left(\frac{N_{BWP}/4}{2^i}\right); \quad (4)$$

or $$m_{SRS,i} = 4 * \left\lfloor \frac{N_{BWP}/4}{2^{B_{SRS}}} \right\rfloor; \quad (5)$$

where $m_{SRS,i}$ is the transmission bandwidth of the reference signal, ceil( ) is a rounding-up function, floor( ) is a rounding-down function, $\lfloor \ \rfloor$ the rounding-down function, for (1), (3) and (5), i=$B_{SRS}$, for (2) and (4), i=0, 1, . . . , $B_{SRS}$, $B_{SRS}$ is the parameter of the transmission bandwidth of the reference signal, $N_{BWP}$ is a value of the bandwidth part, and $B_{SRS}$ and $N_{BWP}$ are configured by the first communication node for the second communication node via the signaling.

Optionally, under a condition that the value of the bandwidth part increases, a transmission bandwidth set of the reference signal corresponding to a value of a bandwidth part at a current level is a subset of a transmission bandwidth set of the reference signal corresponding to a value of a bandwidth part at a next level.

Optionally, a value of the transmission bandwidth includes at least one of 272, 256, 240, 216, 192, 180, 176, 168, 160, 152, 144, 140, 136, 128, 120, 108, 100, 96, 80, 72, 64, 60, 48, 40, 36, 32, 24, 20, 16, 12, 8, or 4.

Optionally, all or part of elements of values of the transmission bandwidth satisfy a characteristic of a power of 2.

Optionally, the method further includes a step described below:

the first communication node jointly indicates whether to trigger a sounding reference signal and the value of the transmission bandwidth of the reference signal to the second communication node via the signaling.

Optionally, the time domain position includes at least one of: not switching transmit antennas at adjacent time domain symbol positions; or not switching transmit antennas at adjacent time domain slot positions.

Optionally, the time domain position includes at least one of: a position of first N time domain symbols among symbols occupied by a slot or a physical uplink shared channel; a position of intermediate N time domain symbols among the symbols occupied by the slot or the physical uplink shared channel; a position of last N time domain symbols among the symbols occupied by the slot or the physical uplink shared channel; a position of N time domain symbols located before a time domain symbol position of an uplink demodulation reference signal; or a position of N time domain symbols located before a time domain symbol position of the physical uplink shared channel;

where N is an integer greater than or equal to 1 and less than or equal to 14.

Optionally, one or more resources constitute a resource group, where transmission bandwidth sets of the reference signal corresponding to different resource groups are different, or transmission bandwidth sets of the reference signal corresponding to different resources are different.

Optionally, information about a multi-level bandwidth structure of the reference signal is associated with an uplink transmission bandwidth corresponding to the second communication node, where the transmission bandwidth is in the uplink transmission bandwidth;

the resource group of the reference signal is associated with an uplink transmission bandwidth;

resource configuration information of the reference signal carries information about one or more multi-level bandwidth structures;

configuration information of the resource group of the reference signal carries information about one or more multi-level bandwidth structures; or the configuration information of the resource group of the reference signal carries selection information of multi-level bandwidth structures;

where the transmission bandwidth of the reference signal belongs to a bandwidth included in one multi-level bandwidth structure, one bandwidth at an n-th level of the multi-level bandwidth structure includes one or more bandwidths at an (n+1)-th level, the resource group of the reference signal includes the one or more resources of the reference signal, and the selection information of multi-level bandwidth structures indicates that one or more multi-level bandwidth structures are selected from more than one predetermined multi-level bandwidth structure.

Optionally, configuration information of uplink transmission bandwidth information carries the information about one or more multi-level bandwidth structures;

a plurality of uplink transmission bandwidths shares information about the multi-level bandwidth structure of the reference signal;

the configuration information of uplink transmission bandwidth information carries the configuration information of the resource group of the reference signal;

the resource configuration information of the reference signal carries the uplink transmission bandwidth information;

the configuration information of the resource group of the reference signal carries the uplink transmission bandwidth information;

the more than one predetermined multi-level bandwidth structure is determined according to the uplink transmission bandwidth information; or the more than one predetermined multi-level bandwidth structure is determined according to a resource group where the resource of the reference signal is located.

Optionally, the signaling includes information about the multi-level bandwidth structure, where the information about the multi-level bandwidth structure includes at least one of: the number M of levels, the number of bandwidths at the (n+1)-th level included in one bandwidth at the n-th level, the selection information of multi-level bandwidth structures, a bandwidth length of a minimum bandwidth, a bandwidth length corresponding to one bandwidth at a j-th level, the total number of bandwidths at an m-th level, or the number of multi-level bandwidth structures, where N belongs to {0, 1, . . . , M−2}, m belongs to {1, 2, . . . , M−1}, j belongs to {0, 1, . . . , M−1}, and M is a natural number and is the number of levels of the multi-level bandwidth structure;

where the transmission bandwidth of the reference signal belongs to a bandwidth included in one multi-level bandwidth structure, one bandwidth at the n-th level of the multi-level bandwidth structure includes one or more bandwidths at the (n+1)-th level, and the selection information of multi-level bandwidth structures indicates that one or more multi-level bandwidth structures are selected from a plurality of predetermined multi-level bandwidth structures.

Optionally, the step in which the first communication node indicates, via the signaling, the resource used by the second communication node for transmitting the reference signal includes a step described below:

the first communication node determines a signaling configuration manner of the transmission bandwidth of the reference signal according to whether frequency hopping is performed on the reference signal.

Optionally, the signaling includes 1-bit indication information which is used for indicating that the reference signal is in a frequency hopping mode or a non-frequency hopping mode.

Optionally, in response to determining that the reference signal is in the frequency hopping mode, configuration information of the transmission bandwidth of the reference signal includes the information about the multi-level bandwidth structure; or in response to determining that the reference signal is in the non-frequency hopping mode, the configuration information of the transmission bandwidth of the reference signal does not include the information about the multi-level bandwidth structure and includes length information of the transmission bandwidth.

Optionally, the signaling includes the time domain position;

the time domain position includes information about a periodic offset set, where the periodic offset set includes at least one periodic offset; and/or the time domain position includes P pieces of periodic offset information, where each of the P pieces of periodic offset information corresponds to Q pieces of offset information, where P is a natural number, Q is an integer, and the periodic offset information carries periodic information and offset information.

Optionally, the periodic offset set includes two types of periodic offsets: an absolute periodic offset and a relative periodic offset;

period information corresponding to the Q pieces of offset information is obtained according to periodic offset information corresponding to the Q pieces of offset information;

each of the Q pieces of offset information corresponds to one piece of information about the number of time domain symbols, where the number of time domain symbols indicates the number of time domain symbols occupied by the reference signal in a first time unit indicated by the offset information;

the each of the Q pieces of offset information corresponds to one piece of time domain symbol position information, where the time domain symbol position information indicates a time domain position occupied by the reference signal in the first time unit indicated by the offset information;

each periodic offset in the periodic offset set corresponds to the one piece of information about the number of time domain symbols, where the number of time domain symbols indicates the number of time domain symbols occupied by the reference signal in the first time unit indicated by the periodic offset information;

the each periodic offset in the periodic offset set corresponds to the one piece of time domain symbol position information, where the time domain symbol position information indicates the time domain symbol position occupied by the reference signal in the first time unit indicated by the periodic offset information;

the information about the periodic offset set corresponds to one piece of index indication information; and/or the time domain position is related to one resource of the reference signal.

Embodiment Two

Figure 3:
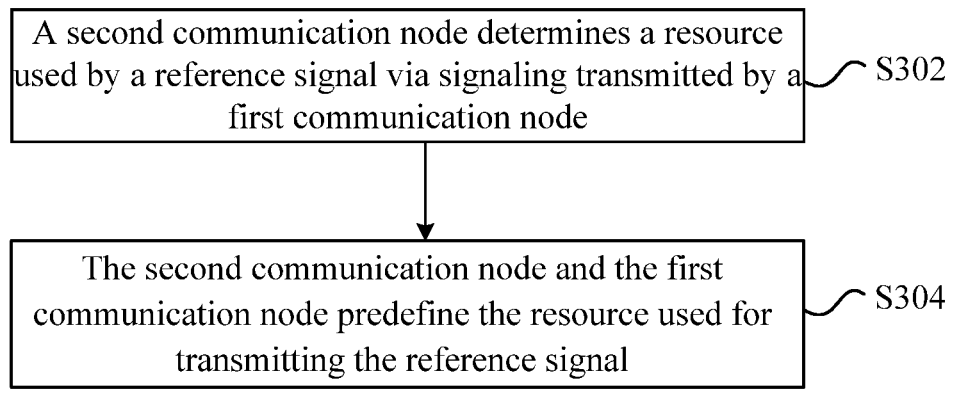
FIG. 3 is flowchart two of a reference signal configuration method according to an embodiment of the present disclosure.

Based on the above-mentioned mobile terminal, another embodiment of the present disclosure further provides a reference signal configuration method. FIG. 3 is flowchart two of a reference signal configuration method according to an embodiment of the present disclosure. As shown in FIG. 3, the method includes step S302 or step S304.

In the step S302, a second communication node determines a resource used by a reference signal via signaling transmitted by a first communication node.

In the step S304, the second communication node and the first communication node predefine the resource used for transmitting the reference signal.

Optionally, the resource includes at least one of a frequency domain starting position, a transmission bandwidth, a bandwidth configuration, or a time domain position.

Optionally, the step in which the second communication node and the first communication node predefine the resource used by the second communication node for transmitting the reference signal includes steps described below:

the second communication node determines a transmission bandwidth set of the reference signal according to a range of a bandwidth part configured by the first communication node;

the second communication node determines the bandwidth configuration of the reference signal according to the range of the bandwidth part configured by the first communication node;

the second communication node determines a transmission bandwidth range or the transmission bandwidth set of the reference signal according to the bandwidth configuration of the reference signal; or the second communication node determines the transmission bandwidth of the reference signal according to a parameter of the transmission bandwidth of the reference signal configured by the first communication node.

Optionally, the step in which the second communication node determines the transmission bandwidth set of the reference signal according to the range of the bandwidth part configured by the first communication node includes at least one of steps described below:

in response to determining that the range of the bandwidth part is greater than 0 and less than or equal to 4 physical resource blocks, the second communication node determines that the transmission bandwidth set of the reference signal includes 4;

in response to determining that the range of the bandwidth part is greater than 4 and less than or equal to 8 physical resource blocks or the range of the bandwidth part is less than or equal to 8 physical resource blocks, the second communication node determines that the transmission bandwidth set of the reference signal includes at least one of 4 or 8;

in response to determining that the range of the bandwidth part is greater than 8 and less than or equal to 16 physical resource blocks, the second communication node determines that the transmission bandwidth set of the reference signal includes at least one of 4, 8, or 16;

in response to determining that the range of the bandwidth part is greater than 16 and less than or equal to 32 physical resource blocks, the second communication node determines that the transmission bandwidth set of the reference signal includes at least one of 4, 8, 16, or 32;

in response to determining that the range of the bandwidth part is greater than 32 and less than or equal to 64 physical resource blocks, the second communication node determines that the transmission bandwidth set of the reference signal includes at least one of 4, 8, 16, 32, or 64;

in response to determining that the range of the bandwidth part is greater than 64 and less than or equal to 128 physical resource blocks, the second communication node determines that the transmission bandwidth set of the reference signal includes at least one of 4, 8, 16, 32, 64, or 128; or in response to determining that the range of the bandwidth part is greater than 128 and less than or equal to 256 physical resource blocks, the second communication node determines that the transmission bandwidth set of the reference signal includes at least one of 4, 8, 16, 32, 64, 128, or 256;

where a unit of an element in the transmission bandwidth set is a physical resource block.

Optionally, the step in which the second communication node determines the bandwidth configuration of the reference signal according to the range of the bandwidth part configured by the first communication node includes at least one of steps described below:

in response to determining that the range of the bandwidth part is greater than 0 and less than or equal to 4 physical resource blocks or the range of the bandwidth part is greater than 0 and less than or equal to 8 physical resource blocks, the second communication node determines the bandwidth configuration of the reference signal to be 0;

in response to determining that the range of the bandwidth part is greater than 4 and less than or equal to 8 physical resource blocks, the second communication node determines the bandwidth configuration of the reference signal to be 1;

in response to determining that the range of the bandwidth part is greater than 8 and less than or equal to 16 physical resource blocks, the second communication node determines the bandwidth configuration of the reference signal to be 2;

in response to determining that the range of the bandwidth part is greater than 16 and less than or equal to 32 physical resource blocks, the second communication node determines the bandwidth configuration of the reference signal to be 3;

in response to determining that the range of the bandwidth part is greater than 32 and less than or equal to 64 physical resource blocks, the second communication node determines the bandwidth configuration of the reference signal to be 4;

in response to determining that the range of the bandwidth part is greater than 64 and less than or equal to 128 physical resource blocks, the second communication node determines the bandwidth configuration of the reference signal to be 5; or in response to determining that the range of the bandwidth part is greater than 128 and less than or equal to 256 physical resource blocks, the second communication node determines the bandwidth configuration of the reference signal to be 6.

Optionally, the step in which the second communication node determines the bandwidth configuration of the reference signal according to the range of the bandwidth part configured by the first communication node includes at least one of steps described below:

in response to determining that the range of the bandwidth part is greater than 128 and less than or equal to 256 physical resource blocks, the second communication node determines the bandwidth configuration of the reference signal to be 0;

in response to determining that the range of the bandwidth part is greater than 64 and less than or equal to 128 physical resource blocks, the second communication node determines the bandwidth configuration of the reference signal to be 1;

in response to determining that the range of the bandwidth part is greater than 32 and less than or equal to 64 physical resource blocks, the second communication node determines the bandwidth configuration of the reference signal to be 2;

in response to determining that the range of the bandwidth part is greater than 16 and less than or equal to 32 physical resource blocks, the bandwidth configuration of the reference signal is determined to be 3;

in response to determining that the range of the bandwidth part is greater than 8 and less than or equal to 16 physical resource blocks, the second communication node determines the bandwidth configuration of the reference signal to be 4;

in response to determining that the range of the bandwidth part is greater than 4 and less than or equal to 8 physical resource blocks or the range of the bandwidth part is greater than 0 and less than or equal to 8 physical resource blocks, the second communication node determines the bandwidth configuration of the reference signal to be 5; or in response to determining that the range of the bandwidth part is greater than 0 and less than or equal to 4 physical resource blocks, the second communication node determines the bandwidth configuration of the reference signal to be 6.

Optionally, the step in which the second communication node determines the transmission bandwidth of the reference signal according to the parameter of the transmission bandwidth of the reference signal configured by the first communication node includes one of equations described below:

$$m_{SRS,i} = 4 * \text{ceil}\left(\frac{N_{BWP}/4}{2^{B_{SRS}}}\right); \quad (1)$$

$$m_{SRS,i} = 4 * \text{ceil}\left(\frac{N_{BWP}/4}{2^i}\right); \quad (2)$$

$$m_{SRS,i} = 4 * \text{floor}\left(\frac{N_{BWP}/4}{2^{B_{SRS}}}\right); \quad (3)$$

$$m_{SRS,i} = 4 * \text{floor}\left(\frac{N_{BWP}/4}{2^i}\right); \quad (4)$$

or $$m_{SRS,i} = 4 * \left\lfloor \frac{N_{BWP}/4}{2^{B_{SRS}}} \right\rfloor; \quad (5)$$

where $m_{SRS,i}$ is the transmission bandwidth of the reference signal, ceil( ) is a rounding-up function, floor( ) is a rounding-down function, $\lfloor \ \rfloor$ is the rounding-down function, for (1), (3) and (5), i=$B_{SRS}$ for (2) and (4), i=0, 1, . . . , $B_{SRS}$, $B_{SRS}$ is the parameter of the transmission bandwidth of the reference signal, $N_{BWP}$ is a value of the bandwidth part, and $B_{SRS}$ and $N_{BWP}$ are configured by the first communication node via the signaling.

Optionally, one or more resources constitute a resource group, where transmission bandwidth sets of the reference signal corresponding to different resource groups are different, or transmission bandwidth sets of the reference signal corresponding to different resources are different.

Optionally, multi-level bandwidth structure information of the reference signal is associated with an uplink transmission bandwidth corresponding to the second communication node, where the transmission bandwidth is from the uplink transmission bandwidth;

the resource group of the reference signal is associated with the uplink transmission bandwidth;

resource configuration information of the reference signal carries information about one or more multi-level bandwidth structures;

configuration information of the resource group of the reference signal carries information about one or more multi-level bandwidth structures; or the configuration information of the resource group of the reference signal carries selection information of multi-level bandwidth structures;

where the transmission bandwidth of the reference signal belongs to a bandwidth included in one multi-level bandwidth structure, one bandwidth at an n-th level of the multi-level bandwidth structure includes one or more bandwidths at an (n+1)-th level, the resource group of the reference signal includes the one or more resources of the reference signal, and the selection information of multi-level bandwidth structures indicates that one or more multi-level bandwidth structures are selected from more than one predetermined multi-level bandwidth structure.

Optionally, the signaling includes information about the multi-level bandwidth structure, where information about the multi-level bandwidth structure includes at least one of the number M of levels, the number of bandwidths at the (n+1)-th level included in one bandwidth at the n-th level, the selection information of multi-level bandwidth structures, a bandwidth length of a minimum bandwidth, a bandwidth length corresponding to one bandwidth at a j-th level, the total number of bandwidths at an m-th level, or the number of multi-level bandwidth structures, where n belongs to $\{0, 1, \ldots, M-2\}$, m belongs to $\{1, 2, \ldots, M-1\}$, j belongs to $\{0, 1, \ldots, M-1\}$, and M is a natural number and the number of levels of the multi-level bandwidth structure;

where the transmission bandwidth of the reference signal belongs to a bandwidth included in one multi-level bandwidth structure, one bandwidth at the n-th level of the multi-level bandwidth structure includes one or more bandwidths at the (n+1)-th level, and the selection information of multi-level bandwidth structures indicates that one or more multi-level bandwidth structures are selected from a plurality of predetermined multi-level bandwidth structures.

Optionally, the step in which the second communication node determines the resource used by the reference signal via the signaling transmitted by the first communication node includes a step described below:

the second communication node receives a signaling indication transmitted by the first communication node, and determines a signaling configuration manner of the transmission bandwidth of the reference signal according to whether frequency hopping is performed on the reference signal.

Embodiment Three

Figure 4:
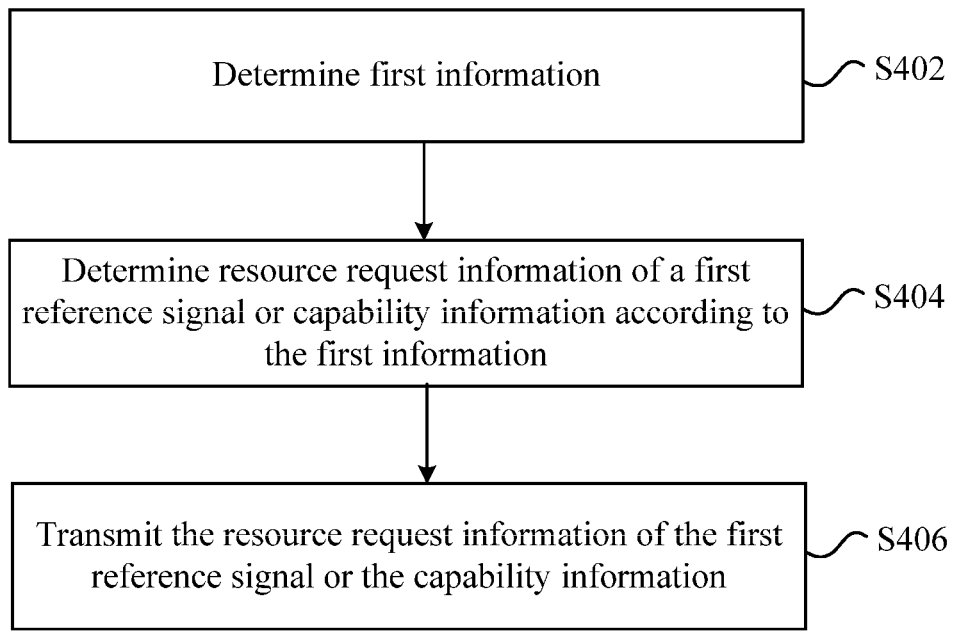
FIG. 4 is flowchart one of an information receiving method according to an embodiment of the present disclosure.

After the technical solution for transmitting a reference signal is improved, to solve the problem in the related art of a defective information transmission solution, another embodiment of the present disclosure further provides an information transmission method. FIG. 4 is flowchart one of an information receiving method according to an embodiment of the present disclosure. As shown in FIG. 4, the method includes step S402 to step S406.

In step S402, first information is determined.

In step S404, resource request information of a first reference signal or capability information is determined according to the first information.

In step S406, the resource request information of the first reference signal or the capability information is transmitted.

The first information includes information about a second signal, and the first reference signal and the second signal have different transmission directions.

Optionally, the information about the second signal includes at least one of: a cell identifier (ID), a synchronization signal (SS) block index, indication information for a downlink reference signal, or indication information for a channel quality feedback parameter.

Optionally, the resource request information of the first reference signal includes at least one of: information about the number of resources of the first reference signal, the number of resource groups of the first reference signal, information about the number of resources included in a resource group of the first reference signal, an index of the resource group of the first reference signal, information about the maximum number of resources which are capable of being simultaneously transmitted in the resource group of the first reference signal, or information about an index of a resource of the first reference signal in the resource group of the first reference signal.

Optionally, the resource group of the first reference signal satisfies at least one of characteristics described below:

only one resource of the reference signal in one resource group of the reference signal is transmittable at one moment;

different resources in one resource group correspond to different beam directions, and different resources in different resource groups correspond to a same beam direction;

different resources in one resource group which are simultaneously transmitted on a same time-frequency code resource reach a receiving end with an interference greater than a predetermined threshold, and different resources in different resource groups which are simultaneously transmitted on the same time-frequency code resource reach the receiving end with an interference less than the predetermined threshold;

different resources in one resource group are capable of being associated with a same transmitting precoding matrix indicator (TPMI), and different resources in different resource groups are incapable of being associated with the same TPMI;

different resources in one resource group is associated with a same reference signal port group, and different resources in different resource groups are incapable of being associated with the same reference signal port group; or any different resources in different resource groups are capable of being simultaneously transmitted, and the number of resources simultaneously transmittable in one resource group is less than or equal to a predetermined threshold;

where the reference signal port group is a demodulation reference signal port group or a sounding reference signal port group, and the reference signal port group has a same transmission direction as the first reference signal.

Optionally, the step in which the first information is determined includes steps described below:

signaling information is received, where the signaling information carries the first information; and the first information is determined via the signaling information.

Optionally, the step in which the resource request information of the first reference signal or the capability information is transmitted includes a step described below:

the first information is carried in the resource request information or the capability information for transmitting.

Optionally, the step in which the resource request information of the first reference signal or the capability information is transmitted includes steps described below:

a channel resource for transmitting the resource request information of the first reference signal or the capability information is determined according to a correspondence, where the correspondence is a correspondence between the first information and the channel resource for transmitting the resource request information of the first reference signal or the capability information; and the resource request information of the first reference signal or the capability information is transmitted according to the determined channel resource.

Embodiment Four

Figure 5:
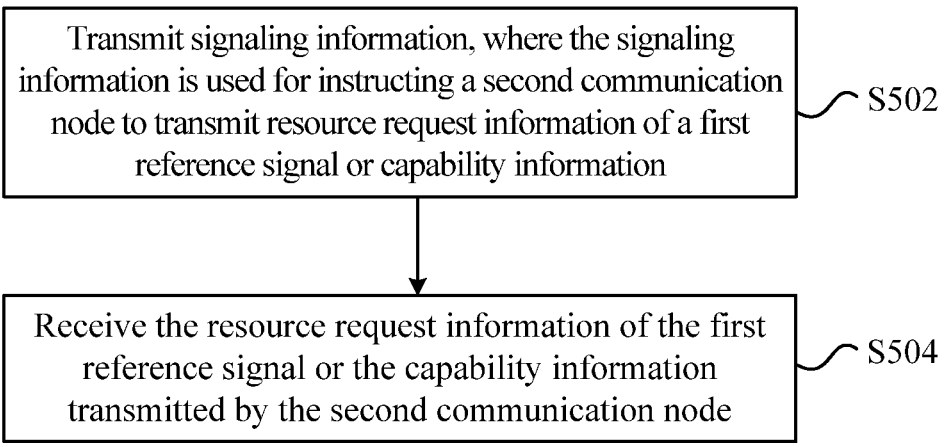
FIG. 5 is flowchart two of an information receiving method according to an embodiment of the present disclosure.

Another embodiment of the present disclosure further provides an information receiving method. FIG. 5 is flowchart two of an information receiving method according to an embodiment of the present disclosure. As shown in FIG. 5, the method includes step S502 to step S504.

In step S502, signaling information is transmitted, where the signaling information is used for instructing a second communication node to transmit resource request information of a first reference signal or capability information.

In step S504, the resource request information of the first reference signal or the capability information transmitted by the second communication node is received.

The signaling information carries first information, the first information includes information about a second signal, and the first reference signal and the second signal have different transmission directions.

Optionally, the information about the second signal includes at least one of: a cell identifier (ID), a synchronization signal (SS) block index, indication information for a downlink reference signal, or indication information for a channel quality feedback parameter.

Optionally, the resource request information of the first reference signal is resource request information corresponding to the first information; and the capability information is capability information corresponding to the first information.

In the embodiments of the present disclosure, the first communication node refers to a node configured to determine a transmission manner of the second communication node and to perform the signaling indication for the second communication node, and the second communication node refers to a node configured to receive the signaling. In an implementation manner, the first communication node may be a base station of a macro cell, a base station or a transmission node of a small cell, a transmission node in a high-frequency communication system, a transmission node in an Internet of Things system or other nodes, and the second communication node may be a node in a communication system such as a UE, a mobile phone, a portable apparatus, or a car. In another implementation manner, the base station of the macro cell, the base station or the transmission node of the small cell, the transmission node in the high-frequency communication system, the transmission node in the Internet of Things system, or the like may serve as the second communication node, and the UE or the like may serve as the first communication node.

It is to be noted that in the present application, the reference signal may be a sounding reference signal (SRS), an uplink/downlink demodulation reference signal, a downlink channel state information reference signal (CSI-RS), or an uplink/downlink phase tracking reference signal (PTRS).

It is to be noted that in the present application, the signaling includes at least one of: radio resource control (RRC) signaling, media access control control element (MAC CE) signaling, or physical downlink control signaling.

The embodiments of the present disclosure will be described below in detail through specific examples.

Example One

A first communication node indicates, via signaling, a resource used by a second communication node for transmitting an uplink reference signal. Alternatively, the first communication node and the second communication node predefine the resource used by the second communication node for transmitting an uplink signal.

The resource includes at least one of a frequency domain starting position or a transmission bandwidth.

A configuration of the transmission bandwidth is shown in table 1, table 2, or table 3. $C_{SRS}$ is a bandwidth configuration parameter of an SRS, $B_{SRS}$ is a bandwidth parameter of the SRS, and value of $C_{SRS}$ and/or $B_{SRS}$ are indicated by the first communication node to the second communication node via the signaling. Ny represents the number of branches at a y-th layer of a tree structure, where y is an integer, such as 0, 1, 2, and 3 in table 1. $m_{SRS,y}$ represents the number of physical resources, occupied by an SRS sequence, at the y-th layer of the tree structure.

TABLE 1

| SRS Bandwidth Configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 256 | 1 | 128 | 2 | 64 | 2 | 4 | 16 |
| 1 | 128 | 1 | 64 | 2 | 16 | 4 | 4 | 4 |
| 2 | 96 | 1 | 48 | 2 | 24 | 2 | 4 | 6 |
| 3 | 96 | 1 | 32 | 3 | 16 | 2 | 4 | 4 |
| 4 | 80 | 1 | 40 | 2 | 20 | 2 | 4 | 5 |
| 5 | 72 | 1 | 24 | 3 | 12 | 2 | 4 | 3 |
| 6 | 64 | 1 | 32 | 2 | 16 | 2 | 4 | 4 |
| 7 | 60 | 1 | 20 | 3 | 4 | 5 | 4 | 1 |
| 8 | 48 | 1 | 24 | 2 | 12 | 2 | 4 | 3 |
| 9 | 48 | 1 | 16 | 3 | 8 | 2 | 4 | 2 |
| 10 | 40 | 1 | 20 | 2 | 4 | 5 | 4 | 1 |
| 11 | 36 | 1 | 12 | 3 | 4 | 3 | 4 | 1 |
| 12 | 32 | 1 | 16 | 2 | 8 | 2 | 4 | 2 |
| 13 | 24 | 1 | 4 | 6 | 4 | 1 | 4 | 1 |
| 14 | 20 | 1 | 4 | 5 | 4 | 1 | 4 | 1 |
| 15 | 16 | 1 | 4 | 4 | 4 | 1 | 4 | 1 |
| 16 | 12 | 1 | 4 | 3 | 4 | 1 | 4 | 1 |
| 17 | 8 | 1 | 4 | 2 | 4 | 1 | 4 | 1 |
| 18 | 4 | 1 | 4 | 1 | 4 | 1 | 4 | 1 |
| 19-31 | Reserved | | | | | | | |

TABLE 2

| SRS Bandwidth Configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 256 | 1 | 128 | 2 | 64 | 2 | 4 | 16 |
| 1 | 128 | 1 | 64 | 2 | 16 | 4 | 4 | 4 |
| 2 | 96 | 1 | 48 | 2 | 24 | 2 | 4 | 6 |
| 3 | 96 | 1 | 32 | 3 | 16 | 2 | 4 | 4 |
| 4 | 80 | 1 | 40 | 2 | 20 | 2 | 4 | 5 |
| 5 | 72 | 1 | 24 | 3 | 12 | 2 | 4 | 3 |
| 6 | 64 | 1 | 32 | 2 | 16 | 2 | 4 | 4 |
| 7 | 60 | 1 | 20 | 3 | 4 | 5 | 4 | 1 |
| 8 | 48 | 1 | 24 | 2 | 12 | 2 | 4 | 3 |
| 9 | 48 | 1 | 16 | 3 | 8 | 2 | 4 | 2 |
| 10 | 40 | 1 | 20 | 2 | 4 | 5 | 4 | 1 |
| 11 | 36 | 1 | 12 | 3 | 4 | 3 | 4 | 1 |
| 12 | 32 | 1 | 16 | 2 | 8 | 2 | 4 | 2 |
| 13 | 16 | 1 | 4 | 4 | 4 | 1 | 4 | 1 |
| 14 | 8 | 1 | 4 | 2 | 4 | 1 | 4 | 1 |
| 15 | 44 | 1 | 4 | 1 | 4 | 1 | 4 | 1 |

TABLE 3

| SRS Bandwidth Configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 256 | 1 | 128 | 2 | 64 | 2 | 4 | 16 |
| 1 | 240 |  | 80 | 3 | 40 | 2 | 4 | 10 |
| 2 | 160 | 1 | 80 | 2 | 40 | 2 | 4 | 10 |
| 3 | 128 | 1 | 64 | 2 | 16 | 4 | 4 | 4 |
| 4 | 96 | 1 | 32 | 3 | 16 | 2 | 4 | 4 |
| 5 | 80 | 1 | 40 | 2 | 20 | 2 | 4 | 5 |
| 6 | 72 | 1 | 24 | 3 | 12 | 2 | 4 | 3 |
| 7 | 64 | 1 | 32 | 2 | 16 | 2 | 4 | 4 |
| 8 | 60 | 1 | 20 | 3 | 4 | 5 | 4 | 1 |
| 9 | 48 | 1 | 16 | 3 | 8 | 2 | 4 | 2 |
| 10 | 40 | 1 | 20 | 2 | 4 | 5 | 4 | 1 |
| 11 | 36 | 1 | 12 | 3 | 4 | 3 | 4 | 1 |
| 12 | 32 | 1 | 16 | 2 | 8 | 2 | 4 | 2 |
| 13 | 16 | 1 | 4 | 4 | 4 | 1 | 4 | 1 |
| 14 | 8 | 1 | 4 | 2 | 4 | 1 | 4 | 1 |
| 15 | 4 | 1 | 4 | 1 | 4 | 1 | 4 | 1 |

Example Two

A first communication node indicates, via signaling, a resource used by a second communication node for transmitting an uplink reference signal. Alternatively, the first communication node and the second communication node predefine the resource used by the second communication node for transmitting an uplink signal.

The resource includes at least one of a frequency domain starting position or a transmission bandwidth.

A configuration of the transmission bandwidth is shown in table 4, table 5 (a), table 5 (b), or table 5 (c).

$N_{BWP}$ is an uplink system bandwidth or an uplink bandwidth part, $B_{SRS}$ is a bandwidth parameter of an SRS, and values of $N_{BWP}$ and/or $B_{SRS}$ are indicated by the first communication node to the second communication node via the signaling.

As can be seen from table 4, when the value of $N_{BWP}$ increases, a transmission bandwidth set of the SRS corresponding to $N_{BWP}$ at a current level is a subset of a transmission bandwidth set of the SRS corresponding to $N_{BWP}$ at a next level, that is, a characteristic of a nested structure is satisfied. For example, when the current level is $0<N_{BWP}\leq4$, the transmission bandwidth set of the SRS is {4}, the transmission bandwidth set of the SRS at the next level $4<N_{BWP}\leq8$ is {4, 8}, the transmission bandwidth set of the SRS at the next level $8<N_{BWP}\leq16$ is {4, 8, 16}, and so on.

In addition, a value of an element in the transmission bandwidth set of the SRS satisfies a characteristic of a power of 2.

TABLE 4

| Range of $N_{BWP}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| $128 < N_{BWP} \leq 256$ | 256 | 1 | 128 | 2 | 64 | 2 | 32 | 2 | 16 | 2 | 8 | 2 | 4 | 2 |
| $64 < N_{BWP} \leq 128$ | 128 | 1 | 64 | 2 | 32 | 2 | 16 | 2 | 8 | 2 | 4 | 2 | 4 | 1 |
| $32 < N_{BWP} \leq 64$ | 64 | 1 | 32 | 2 | 16 | 2 | 8 | 2 | 4 | 2 | 4 | 1 | 4 | 1 |
| $16 < N_{BWP} \leq 32$ | 32 | 1 | 16 | 2 | 8 | 2 | 4 | 2 | 4 | 1 | 4 | 1 | 4 | 1 |
| $8 < N_{BWP} \leq 16$ | 16 | 1 | 8 | 2 | 4 | 2 | 4 | 1 | 4 | 1 | 4 | 1 | 4 | 1 |
| $4 < N_{BWP} \leq 8$ | 8 | 1 | 4 | 2 | 4 | 1 | 4 | 1 | 4 | 1 | 4 | 1 | 4 | 1 |
| $0 < N_{BWP} \leq 4$ | 4 | 1 | 4 | 1 | 4 | 1 | 4 | 1 | 4 | 1 | 4 | 1 | 4 | 1 |

TABLE 5 (a)

| Range of $N_{BWP}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| $128 < N_{BWP} \leq 256$ | 256 | 1 | 128 | 2 | 64 | 2 | 32 | 2 | 16 | 2 | 8 | 2 | 4 | 2 |
| $64 < N_{BWP} \leq 128$ | 128 | 1 | 64 | 2 | 32 | 2 | 16 | 2 | 8 | 2 | 4 | 2 | 4 | 1 |
| $32 < N_{BWP} \leq 64$ | 64 | 1 | 32 | 2 | 16 | 2 | 8 | 2 | 4 | 2 | 4 | 1 | 4 | 1 |
| $16 < N_{BWP} \leq 32$ | 32 | 1 | 16 | 2 | 8 | 2 | 4 | 2 | 4 | 1 | 4 | 1 | 4 | 1 |
| $8 < N_{BWP} \leq 16$ | 16 | 1 | 8 | 2 | 4 | 2 | 4 | 1 | 4 | 1 | 4 | 1 | 4 | 1 |
| $0 < N_{BWP} \leq 8$ | 8 | 1 | 4 | 2 | 4 | 1 | 4 | 1 | 4 | 1 | 4 | 1 | 4 | 1 |

TABLE 5 (b)

| Range of $N_{BWP}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| $256 \leq N_{BWP} < 272$ | 256 | 1 | 128 | 2 | 64 | 2 | 32 | 2 | 16 | 2 | 8 | 2 | 4 | 2 |
| $128 \leq N_{BWP} < 256$ | 128 | 1 | 64 | 2 | 32 | 2 | 16 | 2 | 8 | 2 | 4 | 2 | 4 | 1 |
| $64 \leq N_{BWP} < 128$ | 64 | 1 | 32 | 2 | 16 | 2 | 8 | 2 | 4 | 2 | 4 | 1 | 4 | 1 |
| $32 \leq N_{BWP} < 64$ | 32 | 1 | 16 | 2 | 8 | 2 | 4 | 2 | 4 | 1 | 4 | 1 | 4 | 1 |
| $16 \leq N_{BWP} < 32$ | 16 | 1 | 8 | 2 | 4 | 2 | 4 | 1 | 4 | 1 | 4 | 1 | 4 | 1 |
| $8 \leq N_{BWP} < 16$ | 8 | 1 | 4 | 2 | 4 | 1 | 4 | 1 | 4 | 1 | 4 | 1 | 4 | 1 |
| $0 < N_{BWP} < 8$ | 4 | 1 | 4 | 1 | 4 | 1 | 4 | 1 | 4 | 1 | 4 | 1 | 4 | 1 |

TABLE 5 (c)

| Range of $N_{BWP}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| 272 | 272 | 1 | 136 | 2 | 68 | 2 | 4 | 17 | 4 | 1 | 4 | 1 | 4 | 1 |
| $256 \leq N_{BWP} < 272$ | 256 | 1 | 128 | 2 | 64 | 2 | 32 | 2 | 16 | 2 | 8 | 2 | 4 | 2 |
| $128 \leq N_{BWP} < 256$ | 128 | 1 | 64 | 2 | 32 | 2 | 16 | 2 | 8 | 2 | 4 | 2 | 4 | 1 |
| $64 \leq N_{BWP} < 128$ | 64 | 1 | 32 | 2 | 16 | 2 | 8 | 2 | 4 | 2 | 4 | 1 | 4 | 1 |
| $32 \leq N_{BWP} < 64$ | 32 | 1 | 16 | 2 | 8 | 2 | 4 | 2 | 4 | 1 | 4 | 1 | 4 | 1 |
| $16 \leq N_{BWP} < 32$ | 16 | 1 | 8 | 2 | 4 | 2 | 4 | 1 | 4 | 1 | 4 | 1 | 4 | 1 |
| $8 \leq N_{BWP} < 16$ | 8 | 1 | 4 | 2 | 4 | 1 | 4 | 1 | 4 | 1 | 4 | 1 | 4 | 1 |
| $0 < N_{BWP} < 8$ | 4 | 1 | 4 | 1 | 4 | 1 | 4 | 1 | 4 | 1 | 4 | 1 | 4 | 1 |

Example Three

A first communication node indicates, via signaling, a resource used by a second communication node for transmitting an uplink reference signal. Alternatively, the first communication node and the second communication node predefine the resource used by the second communication node for transmitting an uplink signal.

The resource includes at least one of a frequency domain starting position or a transmission bandwidth.

The transmission bandwidth of an SRS is calculated based on one of the following equations.

$$m_{SRS,i} = 4 * \text{ceil}\left(\frac{N_{BWP}/4}{2^{B_{SRS}}}\right); \quad (1)$$

$$m_{SRS,i} = 4 * \text{ceil}\left(\frac{N_{BWP}/4}{2^i}\right); \quad (2)$$

$$m_{SRS,i} = 4 * \text{floor}\left(\frac{N_{BWP}/4}{2^{B_{SRS}}}\right); \quad (3)$$

$$m_{SRS,i} = 4 * \text{floor}\left(\frac{N_{BWP}/4}{2^i}\right); \quad (4)$$

or $$m_{SRS,i} = 4 * \left\lfloor\frac{N_{BWP}/4}{2^{B_{SRS}}}\right\rfloor; \quad (5)$$

where $m_{SRS,i}$ is the transmission bandwidth of the reference signal, ceil ( ) is a rounding-up function, floor( ) is a rounding-down function, $\lfloor \rfloor$ is the rounding-down function, for (1), (3) and (5), i=$B_{SRS}$ for (2) and (4), i=0, 1, . . . , $B_{SRS}$, and $B_{SRS}$ is a parameter of the transmission bandwidth of the reference signal and is configured by the first communication node for the second communication node via the signaling.

$m_{SRS,i}$ is the transmission bandwidth of the SRS or referred to as a transmission bandwidth at an i-th level of a tree structure of a bandwidth configuration of the SRS, i=$B_{SRS}$ 0≤$B_{SRS}$≤6, $B_{SRS}$ is a bandwidth parameter of the SRS and a value of is configured by a base station for a UE. $N_{BWP}$ is an uplink system bandwidth or an uplink bandwidth part, and a value of $N_{BWP}$ is configured by the base station for the UE. ceil ( ) is the rounding-up function, floor( ) is the rounding-down function, and L J is the rounding-down function.

Example Four

A first communication node and a second communication node predefine a transmission bandwidth used by the second communication node for transmitting an uplink signal, which includes determining a bandwidth configuration of a reference signal according to a range or a set of a configured bandwidth part.

As shown in table 6, table 7, table 8, or table 9:

TABLE 6

| Range of $N_{BWP}$ | SRS Bandwidth Configuration |
|---|---|
| 128 < $N_{BWP}$ ≤ 256 | 0 |
| 64 < $N_{BWP}$ ≤ 128 | 1 |
| 32 < $N_{BWP}$ ≤ 64 | 2 |
| 16 < $N_{BWP}$ ≤ 32 | 3 |
| 8 < $N_{BWP}$ ≤ 16 | 4 |
| 4 < $N_{BWP}$ ≤ 8 | 5 |
| 0 < $N_{BWP}$ ≤ 4 | 6 |

TABLE 7

| Range of $N_{BWP}$ | SRS Bandwidth Configuration |
|---|---|
| 128 < $N_{BWP}$ ≤ 256 | 0 |
| 64 < $N_{BWP}$ ≤ 128 | 1 |
| 32 < $N_{BWP}$ ≤ 64 | 2 |

TABLE 7-continued

| Range of $N_{BWP}$ | SRS Bandwidth Configuration |
|---|---|
| 16 < $N_{BWP}$ ≤ 32 | 3 |
| 8 < $N_{BWP}$ ≤ 16 | 4 |
| 0 < $N_{BWP}$ ≤ 8 | 5 |

TABLE 8

| Range of $N_{BWP}$ | SRS Bandwidth Configuration |
|---|---|
| 0 < $N_{BWP}$ ≤ 4 | 0 |
| 4 < $N_{BWP}$ ≤ 8 | 1 |
| 8 < $N_{BWP}$ ≤ 16 | 2 |
| 16 < $N_{BWP}$ ≤ 32 | 3 |
| 32 < $N_{BWP}$ ≤ 64 | 4 |
| 64 < $N_{BWP}$ ≤ 128 | 5 |
| 128 < $N_{BWP}$ ≤ 256 | 6 |

TABLE 9

| Range of $N_{BWP}$ | SRS Bandwidth Configuration |
|---|---|
| 0 < $N_{BWP}$ ≤ 8 | 0 |
| 8 < $N_{BWP}$ ≤ 16 | 1 |
| 16 < $N_{BWP}$ ≤ 32 | 2 |
| 32 < $N_{BWP}$ ≤ 64 | 3 |
| 64 < $N_{BWP}$ ≤ 128 | 4 |
| 128 < $N_{BWP}$ ≤ 256 | 5 |

Example Five

A first communication node and a second communication node predefine a transmission bandwidth used by the second communication node for transmitting an uplink signal, which includes at least one of steps described below:

a transmission bandwidth range or a transmission bandwidth set of a reference signal is determined according to a bandwidth configuration of the reference signal; or the transmission bandwidth of the reference signal is determined according to a configured bandwidth parameter of the reference signal.

An index of a bandwidth configuration of an SRS may be indicated by the first communication node to the second communication node via signaling, or the second communication node determines an index of the bandwidth configuration of the reference signal according to a range or a set of a configured bandwidth part. The index of the bandwidth configuration and a bandwidth length of the SRS may refer to table 12, and a unit of the bandwidth length of the SRS is a physical resource block (PRB).

As shown in table 10 or table 11, the second communication node determines the transmission bandwidth range or the transmission bandwidth set of the reference signal according to the bandwidth configuration of the reference signal, and determines the transmission bandwidth $m_{SRS,i}$ of the reference signal according to a value of a configured bandwidth parameter $B_{SRS}$ of the reference signal, where a value set of i is {0, 1, 2, 3, 4, 5, 6}.

TABLE 10

| SRS Bandwidth Configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| 0 | 256 | 1 | 128 | 2 | 64 | 2 | 32 | 2 | 16 | 2 | 8 | 2 | 4 | 2 |
| 1 | 128 | 1 | 64 | 2 | 32 | 2 | 16 | 2 | 8 | 2 | 4 | 2 | 4 | 1 |
| 2 | 64 | 1 | 32 | 2 | 16 | 2 | 8 | 2 | 4 | 2 | 4 | 1 | 4 | 1 |
| 3 | 32 | 1 | 16 | 2 | 8 | 2 | 4 | 2 | 4 | 1 | 4 | 1 | 4 | 1 |
| 4 | 16 | 1 | 8 | 2 | 4 | 2 | 4 | 1 | 4 | 1 | 4 | 1 | 4 | 1 |
| 5 | 8 | 1 | 4 | 2 | 4 | 1 | 4 | 1 | 4 | 1 | 4 | 1 | 4 | 1 |
| 6 | 4 | 1 | 4 | 1 | 4 | 1 | 4 | 1 | 4 | 1 | 4 | 1 | 4 | 1 |
| 7 | | | | | | | Reserved | | | | | | | |

TABLE 11

| SRS Bandwidth Configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | | SRS-Bandwidth $B_{SRS}=4$ | | SRS-Bandwidth $B_{SRS}=5$ | | SRS-Bandwidth $B_{SRS}=6$ | |
|---|---|---|---|---|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | $m_{SRS,4}$ | $N_4$ | $m_{SRS,5}$ | $N_5$ | $m_{SRS,6}$ | $N_6$ |
| 0 | 256 | 1 | 128 | 2 | 64 | 2 | 32 | 2 | 16 | 2 | 8 | 2 | 4 | 2 |
| 1 | 128 | 1 | 64 | 2 | 32 | 2 | 16 | 2 | 8 | 2 | 4 | 2 | 4 | 1 |
| 2 | 64 | 1 | 32 | 2 | 16 | 2 | 8 | 2 | 4 | 2 | 4 | 1 | 4 | 1 |
| 3 | 2 | 1 | 16 | 2 | 8 | 2 | 4 | 2 | 4 | 1 | 4 | 1 | 4 | 1 |
| 4 | 16 | 1 | 8 | 2 | 4 | 2 | 4 | 1 | 4 | 1 | 4 | 1 | 4 | 1 |
| 5 | 8 | 1 | 4 | 2 | 4 | 1 | 4 | 1 | 4 | 1 | 4 | 1 | 4 | 1 |
| -7 | | | | | | | Reserved | | | | | | | |

Example Six

A first communication node configures, via signaling, a size of a transmission bandwidth of an SRS for a second communication node, or the first communication node jointly indicates, whether to trigger the SRS and the size of the transmission bandwidth of the SRS to the second communication node via the signaling.

TABLE 12

| SRS Bandwidth Indication Index | SRS Bandwidth (in PRBs) |
|---|---|
| 0 | 96 |
| 1 | 80 |
| 2 | 72 |
| 3 | 64 |
| 4 | 60 |
| 5 | 48 |
| 6 | 40 |
| 7 | 32 |
| 8 | 24 |
| 9 | 20 |
| 10 | 16 |
| 11 | 12 |
| 12 | 8 |
| 13 | 4 |

Example Seven

In this embodiment, a first communication node transmits signaling information, where the signaling information is used for instructing a second communication node to transmit resource request information of a first reference signal (or for instructing the second communication node to transmit capability reporting information). The signaling information carries first information, where the first information includes at least one of: a cell ID, an SS block index, resource indication information of a second reference signal, or reporting-parameter indication information. The first reference signal and the second reference signal have different transmission directions, where the transmission directions include a first transmission direction in which the first communication node performs a transmission and the second communication node performs a reception, and a second transmission direction in which the second communication node performs a transmission and the first communication node performs a reception. The reporting-parameter indication information is associated with the second reference signal.

Furthermore, the second communication node transmits the resource request information of the first reference signal associated with the first information (or the second communication node transmits capability information associated with the first information).

Furthermore, the resource request information of the first reference signal includes at least one of: information about the number of resources of the first reference signal, the number of resource groups of the first reference signal, information about the number of resources included in a resource group of the first reference signal, an index of the resource group of the first reference signal, information about the maximum number of resources which are capable of being simultaneously transmitted by the second communication node in the resource group of the first reference signal, or information about an index of a resource of the first reference signal among the resources of the first reference signal.

The resource group satisfies at least one of characteristics described below.

The second communication node can only transmit one reference signal resource in one reference signal resource group at one moment, that is, the second communication node cannot simultaneously transmit different reference signal resources in one resource group.

The second communication node may simultaneously transmit any different resources in different resource groups, and the second communication node can simultaneously transmit the maximum number M of resources in one resource group.

Beam directions correspond to different resources in one resource group are different, and beam directions correspond to different SRS resources in different resources may be the same. The beam direction may also be referred to as a spatial filtering parameter, and it is merely that different SRS resource groups correspond to different panels.

Different SRS resources in one SRS resource group which are simultaneously transmitted on a same time-frequency code resource reach a receiving end with an interference between each other greater than a predetermined threshold, and different SRS resources in different SRS resource groups which are simultaneously transmitted on a same time-frequency code resource reach the receiving end with an interference between each other less than the predetermined threshold.

Different SRS resources in one SRS resource group are associated with the same TPMI or one SRS resource or one DMRS, and different SRS resources in different SRS resource groups cannot be associated with the same TPMI or one SRS resource or one DMRS. That is, beams corresponding to SRS resources in one SRS resource group can perform a coherent transmission, and SRS resources in different SRS resource groups cannot perform the coherent transmission.

Figure 6:
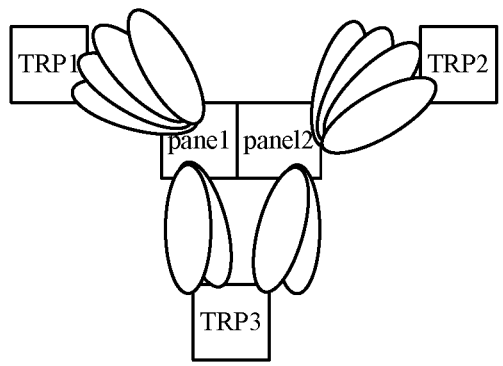
FIG. 6 is schematic diagram one of a resource configuration between a terminal and a base station according to an embodiment of the present disclosure.
Figure 7:
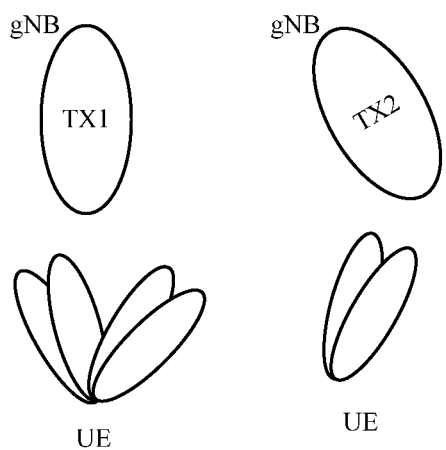
FIG. 7 is schematic diagram two of a resource configuration between a terminal and a base station according to an embodiment of the present disclosure.

Optionally, the first communication node is a base station, the second communication node is a terminal, the first reference signal is an uplink reference signal, and the second reference signal is a downlink reference signal. The base station transmits the signaling information to the terminal to instruct the terminal to transmit resource request information of the uplink reference signal, where the signaling information carries the first information, and the first information includes at least one of the Cell ID, the SS block index, resource indication information of the downlink reference signal. The terminal transmits the resource request information of the uplink reference signal for the first information. The resource request information of the uplink reference signal is used for uplink beam scanning. FIG. 6 is schematic diagram one of a resource configuration between the terminal and the base station according to an embodiment of the present disclosure. FIG. 7 is schematic diagram two of the resource configuration between the terminal and the base station according to an embodiment of the present disclosure. As shown in FIGS. 6 and 7, when the terminal have multiple panels (panel), different transmission and reception node (TRPs) (or gNBs) are aligned with different numbers of panels of the terminal. The panel may be specifically an antenna panel, for example, TRP1 is aligned with panel1, TRP2 is aligned with panel2, and TRP3 is aligned with panel1 and panel2. If different TRPs are distinguished by different CSI-RS resource settings, for example, CSI-RS resource settings 1 to 3 correspond to TRP1 to TRP3, the terminal measures a CSI-RS included in CSI-RS resource setting i through CSI-RS resource setting i (i=1, 2, 3) to obtain a downlink panel aligned with CSI-RS resource setting i and the number of beams of the terminal for each panel aligned with CSI-RS resource setting i. Therefore, the terminal reports the resource request information of the uplink reference signal corresponding to CSI-RS resource setting i to the base station. Optionally, the terminal requests different SRS resources for different CSI-RS resource settings, for example, the request information is described as follows.

For CSI-RS resource setting 1, the number of requested SRS resources is 4, the number of SRS resource groups is 1, an index of an SRS resource group where the SRS resources are located is 1, index information of the requested four SRS resources in a first SRS resource group is (111100000000), and the terminal may simultaneously transmit at most four SRS resources in SRS resource group one at one moment (for example, four TXRUs in panel1 and two TXRUs in panel2).

For CSI-RS resource setting 2, the number of requested SRS resources is 4, the number of SRS resource groups is 1, an index of the SRS resource group where the SRS resources are located is 2, index information of the requested four SRS resources in the first SRS resource group is (100010001100), and the terminal may simultaneously transmit at most two SRS resources in SRS resource group two at one moment.

For CSI-RS resource setting 3, the number of requested SRS resources is 4, the number of SRS resource groups is 2, indexes of SRS resource groups where the SRS resources are located is {1, 2}, 2 SRS resources are included in SRS resource group one, and 2 SRS resources are included in SRS resource group two. An index of the two SRS resources requested in SRS resource group one is (000000000011) in SRS resource group one and an index of the two SRS resources requested in SRS resource group two is (100000000001) in SRS resource group two. The terminal may simultaneously transmit at most four SRS resources in SRS resource group one at one moment, and the terminal may simultaneously transmit at most two SRS resources in SRS resource group one at one moment.

After acquiring the information, the base station learns that a connection between TRP1 and the terminal is independent of a connection between TRP2 and the terminal and do not interfere with each other (because indexes of resource groups of the uplink reference signal requested by the terminal for TRP1 and TRP2 are different), and independent scheduling and/or parallel beam training may be performed. Beam training between TRP1 and the terminal and beam training between TRP3 and the terminal cannot be performed independently, because the terminal cannot simultaneously generate beams between TRP1 and between TRP3, and an interference exists between beams for communications between the terminal and the two TRPs.

On the other hand, the terminal may plan itself to request different SRS resource information for different CSI-RS resource settings, so that beam training and data communications between different CSI-RS resource settings and terminal can be performed independently.

In the above-mentioned implementation manners, the resource indication information of the downlink reference signal is an index of the CSI-RS resource setting, and a resource indication of the downlink reference signal may also be an index of a CSI-RS resource set or an index of a CSI-RS resource; and reporting information parameter indication information is an index of a report setting, where the report setting is associated with the CSI-RS resource setting.

In this embodiment, the signaling information transmitted by the base station carries the first information, and this embodiment does not exclude that an uplink channel resource for the terminal to report the request information is associated with the first information. For example, a first uplink channel (such as PUSCH1) is associated with CSI-RS resource setting 1, and a second uplink channel (such as PUSCH2) is associated with CSI-RS resource setting 2. An association between the uplink channel resource and the first information may be indicated by the base station, or may be obtained by a rule agreed between the base station and the terminal.

Example Eight

In this embodiment, a second communication node transmits resource request information of a first reference signal, where the resource request information of the first reference signal is associated with first information. The first information includes at least one of: a cell ID, an SS block index, resource indication information of a second reference signal, or reporting-parameter indication information. The first reference signal and the second reference signal have different transmission directions, where the transmission directions include a first transmission direction in which a first communication node performs a transmission and the second communication node performs a reception, and a second transmission direction in which the second communication node performs a transmission and the first communication node performs a reception. The reporting-parameter indication information is associated with the second reference signal.

Optionally, for example, a terminal requests an SRS resource, and there is an association between the request information and the first information. The association indicates that one piece of request information carries one piece of first information, or a mapping relationship exists between a channel for transmitting the request information and the first information.

Example Nine

In this embodiment, a first communication node transmits a first indication information list to a second communication node, and the second communication node reports the number of resource groups transmittable in parallel of a first reference signal (and/or resource processes transmittable in parallel of the first reference signal) and first indication information corresponding to each resource group of the first reference signal, for the first indication information list.

The first indication information includes at least one of: a cell ID, an SS block index, resource indication information of a second reference signal, or reporting-parameter indication information. The first reference signal and the second reference signal have different transmission directions, where the transmission directions include a first transmission direction in which the first communication node performs a transmission and the second communication node performs a reception, and a second transmission direction in which the second communication node performs a transmission and the first communication node performs a reception. The reporting-parameter indication information is associated with the second reference signal.

Optionally, for example, different first indication information corresponds to different TRPs. By properly planning its own transmission resources (including panels, transmission resource units (TXRUs), and beams), the terminal plans the number of SRS resource groups capable of being transmitted in parallel and a TRP corresponding to each SRS resource group for the first indication information list information.

Alternatively, according to embodiments 1 and 2, the terminal requests an SRS resource for each piece of first indication information in the list, and further reports whether an interference exists between SRS resources requested by different first indication information.

Example Ten

In this embodiment, a base station transmits signaling information to a terminal, where the signaling information carries a BWP (that is, an uplink transmission bandwidth) and multi-level bandwidth structure information. One bandwidth at an n-th level of a multi-level bandwidth structure includes one or more bandwidths at an (n+1)-th level. A bandwidth at each level has a same length, for example, a tree structure. The multi-level bandwidth structure is referred to as a tree below.

One or more trees are configured in configuration information of the BWP, where the one or more trees are shared by SRS resources corresponding to the BWP.

For example, multiple trees are configured in the BWP, and one tree is selected in an SRS resource group or one tree is selected in an SRS resource.

Multiple trees are configured in the BWP, multiple trees are selected in the SRS resource group, and one tree is selected in the SRS resource.

Figure 8:
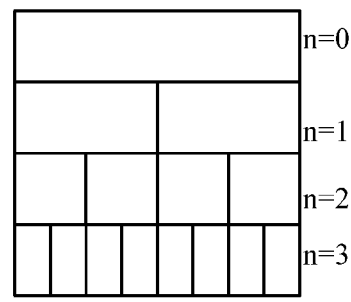
FIG. 8 is schematic diagram one of a multi-level bandwidth structure according to an embodiment of the present disclosure.
Figure 9:
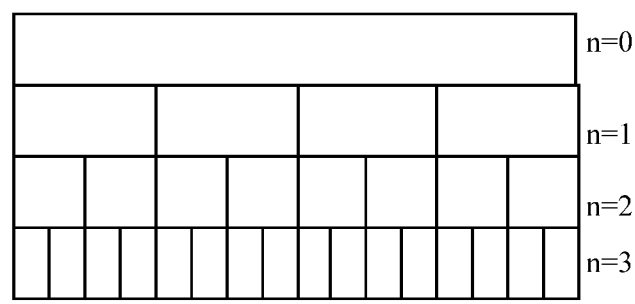
FIG. 9 is schematic diagram two of a multi-level bandwidth structure according to an embodiment of the present disclosure.

FIG. 8 is schematic diagram one of a multi-level bandwidth structure according to an embodiment of the present disclosure. FIG. 9 is schematic diagram two of a multi-level bandwidth structure according to an embodiment of the present disclosure. As shown in FIGS. 8 and 9, configuration signaling of the tree includes at least one of: the number M of levels of the tree (e.g., the trees in FIGS. 8 and 9 include four levels), the number of bandwidths at an (n+1)-th level included in one bandwidth at an n-th level (n belongs to {0, 1, . . . , M−2}) (e.g., the number of bandwidths at level {1, 2, 3} corresponding to one bandwidth at level {0, 1, 2} in FIG. 8 is {2, 2, 2} respectively, and the number of bandwidths at level {1, 2, 3} corresponding to one bandwidth at level {0, 1, 2} in FIG. 9 is {4, 2, 2} respectively), a bandwidth length of a minimum bandwidth (e.g., a frequency domain length of one bandwidth at level 3 in FIGS. 8 and 9 is 4 PRBs), a bandwidth length corresponding to one bandwidth at the n-th level (e.g., in FIG. 8, a frequency domain length of one bandwidth at level 3 is 4 PRBs, a length of one bandwidth at level 2 is 8 PRBs, a length of one bandwidth at level 1 is 16 PRBs, and a bandwidth length corresponding to one bandwidth at level 0 is 32 PRBs), the total number of bandwidths at each level (e.g., the total number of bandwidths at level {1, 2, 3} in FIG. 8 is all 2, and the total number of bandwidths at level {1, 2, 3} in FIG. 9 is {4, 8, 16} respectively), selection information of multi-level bandwidth structures (e.g., one multi-level bandwidth structure is selected from predetermined multi-level bandwidth structures, similar to a function of a C_SRS in LTE), or the number of multi-level bandwidth structures (the number of trees).

Optionally, when multiple BWPs are configured for the terminal, the multiple BWPs share a set of multi-level bandwidth configuration information.

In this embodiment, the signaling information is dedicated signaling.

Example Eleven

In this example, multi-level bandwidth information (i.e., tree-like bandwidth information) is configured in an SRS resource or an SRS resource set.

Tree-like bandwidth structure information includes at least one of: the number M of levels of a tree (e.g., trees in FIGS. 8 and 9 include four levels), the number of bandwidths at an (n+1)-th level included in one bandwidth at an n-th level (n belongs to $\{0, 1, \ldots, M-2\}$) (e.g., the number of bandwidths at level $\{1, 2, 3\}$ corresponding to one bandwidth at level $\{0, 1, 2\}$ in FIG. 8 is $\{2, 2, 2\}$ respectively, and the number of bandwidths at level $\{1, 2, 3\}$ corresponding to one bandwidth at level $\{0, 1, 2\}$ in FIG. 9 is $\{4, 2, 2\}$ respectively), a bandwidth length of a minimum bandwidth (e.g., a frequency domain length of one bandwidth at level 3 in FIGS. 8 and 9 is 4 PRBs), a bandwidth length corresponding to one bandwidth at level n (e.g., in FIG. 8, a frequency domain length of one bandwidth at level 3 is 4 PRBs, a length of one bandwidth at level 2 is 8 PRBs, a length of one bandwidth at level 1 is 16 PRBs, and a bandwidth length corresponding to one bandwidth at level 0 is 32 PRBs), or the total number of bandwidths at each level (e.g., the total number of bandwidths at level $\{1, 2, 3\}$ in FIG. 8 is all 2, and the total number of bandwidths at level $\{1, 2, 3\}$ in FIG. 9 is $\{4, 8, 16\}$ respectively), selection information of multi-level bandwidth structures (e.g., one multi-level bandwidth structure is selected from predetermined multi-level bandwidth structures, similar to a function of a C_SRS in LTE), or the number of multi-level bandwidth structures (the number of trees).

Optionally, multiple trees are configured in an SRS resource group, and one tree is selected in the SRS resource.

Alternatively, multiple trees are configured in the SRS resource, and one tree is selected from the multiple trees via configuration signaling of the SRS resource.

Example Twelve

In this embodiment, 1-bit signaling is used for indicating whether an uplink reference signal is in a frequency hopping mode or a non-frequency hopping mode, and bandwidth information of the reference signal corresponding to the frequency hopping mode and the non-frequency hopping mode is configured in different manners.

When the uplink reference signal is in the frequency hopping mode, bandwidth configuration information of the uplink reference signal includes tree structure information, and when the uplink reference signal is in the non-frequency hopping mode, the bandwidth configuration information of the uplink reference signal does not include the tree structure information and includes bandwidth length information.

Optionally, for example, when a length of a BWP is 80 to 110, the BWP corresponds to eight trees (as shown in table 13 which is just an example, and other tree structures are not excluded). When an SRS is in the frequency hopping mode, it is necessary to configure a C_SRS (selection information of tree structures), a B_SRS (bandwidth information of the reference signal transmitted on a time domain symbol), a frequency domain starting position of the reference signal, a frequency hopping bandwidth range (or level information of a frequency hopping bandwidth in the tree structure, similar to a function of b hop in LTE).

When the SRS is in the non-frequency hopping mode, only the frequency domain starting position of the reference signal and information about a bandwidth length occupied by the reference signal need to be configured.

TABLE 13

| SRS Bandwidth Configuration | SRS-Bandwidth $B_{SRS} = 0$ | | SRS-Bandwidth $B_{SRS} = 1$ | | SRS-Bandwidth $B_{SRS} = 2$ | | | SRS-Bandwidth $B_{SRS} = 3$ | |
|---|---|---|---|---|---|---|---|---|---|
| $C_{SRS}$ | $m_{SRS,0}$ | $N_0$ | $m_{SRS,1}$ | $N_1$ | • | $m_{SRS,0}$ | $N_0$ | $m_{SRS,1}$ | |
| 0 | 96 | 1 | 48 | 2 | 0 | 96 | 1 | 48 | |
| 1 | 96 | 1 | 32 | 3 | 1 | 96 | 1 | 32 | |
| 2 | 80 | 1 | 40 | 2 | 2 | 80 | 1 | 40 | |
| 3 | 72 | 1 | 24 | 3 | 3 | 72 | 1 | 24 | |
| 4 | 64 | 1 | 32 | 2 | 4 | 64 | 1 | 32 | |
| 5 | 60 | 1 | 20 | 3 | 5 | 60 | 1 | 20 | |
| 6 | 48 | 1 | 24 | 2 | 6 | 48 | 1 | 24 | |
| 7 | 48 | 1 | 16 | 3 | 7 | 48 | 1 | 16 | |

Optionally, the bandwidth length in the non-frequency hopping mode is obtained by arranging all bandwidth lengths included in the tree structure in the frequency hopping mode in a length order, for example, a bandwidth length table 14 in the non-frequency hopping mode is obtained according to table 13. In this way, in the non-frequency hopping mode, only 4 bits are needed to configure information about a frequency domain bandwidth, and the C_SRS and the $B_{SRS}$ are not needed to be configured by using 5 bits in total.

TABLE 14

| Bandwidth Length Index | SRS Length (PRB) |
|---|---|
| 0 | 96 |
| 1 | 80 |
| 2 | 72 |
| 3 | 64 |
| 4 | 60 |
| 5 | 48 |
| 6 | 40 |
| 7 | 32 |
| 8 | 24 |
| 9 | 20 |
| 10 | 16 |
| 11 | 12 |
| 12 | 8 |
| 13 | 4 |

Example Thirteen

In this embodiment, multiple multi-level bandwidth structures are established via dedicated control signaling. Under a same bandwidth (for example, under a same BWP), different users may be configured with different numbers of multi-level bandwidth structures. One multi-level bandwidth structure corresponds to one bandwidth tree structure.

Alternatively, for a same user, different BWPs configured may correspond to different numbers of multi-level bandwidth structures, that is, different numbers of bandwidth trees. For example, the number of trees corresponding to a small BWP is different from the number of trees corresponding to a large BWP.

Example Fourteen

In this embodiment, one reference signal resource corresponds to one piece of periodic offset set information.

Optionally, for example, the reference signal resource is an SRS resource, and one SRS resource corresponds to one piece of periodic offset set information. For example, a correspondence among periodic offset information, a period, and offset information of an SRS is shown in table 15 (table 15 is just an example, and other tables are not excluded in the present application). $I_{SRS}$ indicates that a slot where the SRS is located is nSRS, where (nSRS−Toffset) mod TSRS=0. One SRS resource corresponds to multiple pieces of periodic offset information, and one SRS resource corresponds to one periodic offset set, that is, one SRS resource corresponds to multiple $I_{SRS}$.

TABLE 15

| Periodic Offset Index $I_{SRS}$ | SRS Period $T_{SRS}$ | SRS Offset $T_{offset}$ |
| --- | --- | --- |
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | Reserved | Reserved |

Optionally, it is limited that the multiple pieces of periodic offset information corresponding to one SRS resource correspond to a same period.

Optionally, it is limited that one SRS resource occupies a same number of time domain symbols and/or a same time domain symbol position in time units indicated by the multiple pieces of periodic offset information corresponding to the one SRS resource. Alternatively, a time domain symbol position and/or the number of time domain symbols occupied by the SRS in each of multiple time units indicated by the multiple pieces of periodic offset information corresponding to the one SRS resource may be notified via signaling information. That is, each piece of period offset information corresponds to one piece of information about the number of time domain symbols and/or one piece of time domain symbol position information.

Figure 10:
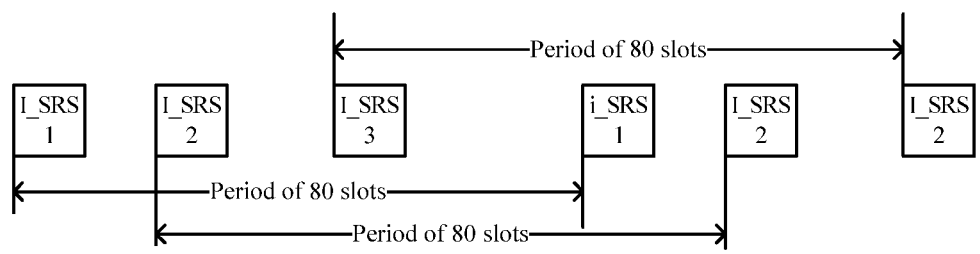
FIG. 10 is schematic diagram one of positions occupied by resources according to an embodiment of the present disclosure.

Optionally, multiple pieces of periodic offset information corresponding to a first SRS resource have two types of periodic offsets. The first type of periodic offset information is absolute periodic offset information, and the second type of periodic offset information is relative offset information. For example, a period offset set corresponding to SRS resource1 is ($I_{SRS1}=77$, $I_{SRS2}=79$, $I_{SRS3}=83$) in table 15. In this case, ($I_{SRS1,relative}=2$, $I_{SRS2}=79$, $I_{SRS3,relative}=7$) may be configured in the signaling information, where $I_{SRS2}$ is absolute periodic offset information, $I_{SRS1,relative}$, $I_{SRS3,relative}$ are offset information relative to a slot where an SRS corresponding to $I_{SRS2}$ is located, and period information corresponding to is obtained according to $I_{SRS1,relative}$, $I_{SRS3,relative}$ $I_{SRS2}$. Specifically, for a time domain position occupied by SRS resource1, FIG. 10 is schematic diagram one of positions occupied by resources according to an embodiment of the present disclosure. As shown in FIG. 10, for a further correspondence between a relative offset index and a relative offset, reference may be made to a mapping relationship in table 16 (of course, this embodiment does not exclude other mapping relationships), and then a slot position corresponding to relative periodic offset information is nSRS, where (nSRS−(Toffset, relative+Toffset, reference)) mod TSRS, reference=0, where Toffset, relative is a relative periodic offset, Toffset, reference is offset information of a periodic offset to which the relative periodic offset refers, and TSRS, reference is a period of an absolute periodic offset to which the relative periodic offset refers. Specifically, a number of a slot where $I_{SRS1,relative}$ is located is nSRS2, where (nSRS2−(−2+2))mod 80=0, and a number of a slot where $I_{SRS3}$ is located is nSRS3, where (nSRS3−(4+2))mod 80=0.

TABLE 16

| Relative Offset Index $I_{SRS}$, relative | Relative Offset $T_{offset, relative}$ |
| --- | --- |
| 0 | −4 |
| 1 | −3 |
| 2 | −2 |
| 3 | −1 |
| 4 | 1 |
| 5 | 2 |
| 6 | 3 |
| 7 | 4 |

Optionally, one SRS resource corresponds to N pieces of periodic offset information, and each piece of periodic offset information corresponds to M pieces of offset information, where N is a natural number and M is an integer. A period of the M pieces of offset information corresponding to one piece of periodic offset information is obtained according to a period in the periodic offset information.

Specifically, for example, SRS resource1 corresponds to $I_{SRS1}=77$, $I_{SRS2}=79$, $I_{SRS3}=83$ $I_{SRS4}=17$, $I_{SRS5}=19$)) and (in table 15. These periods are divided into two types, where the first type is ($I_{SRS1}=77$, $I_{SRS2}=79$, $I_{SRS3}=83$), and the second type is ($I_{SRS4}=17$) $I_{SRS5}=19$). For each type, one periodic offset is selected to be indicated by periodic offset information, and other periodic offset information is only expressed by offset information. For example, the above information may be expressed as ($I_{SRS1}=77$, $I_{SRS2}=2$, $I_{SRS3}=5$, $I_{SRS4}=17$, $I_{SRS5}=2$), and then SRS resource1 occupies the following slots: ($n_{SRS1}-(0)$)mod80=0, ($n_{SRS2}-(2)$)mod80=0, ($n_{SRS3}-(5)$)mod80=0 ($n_{SRS4}-(0)$)mod20=0, and ($n_{SRS5}-(2)$)mod20=0.

Figure 11:
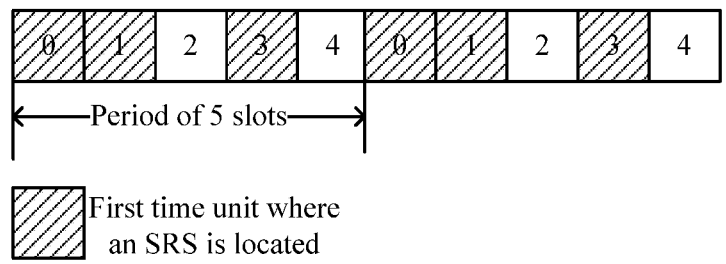
FIG. 11 is schematic diagram two of positions occupied by resources according to an embodiment of the present disclosure.

Optionally, FIG. 11 is schematic diagram two of positions occupied by resources according to an embodiment of the present disclosure. As shown in FIG. 11, one piece of index indication information corresponds to one periodic offset set. As shown in table 17, when ISRS is 2, 3, 4, 5, and 6, the periodic offset set corresponding to ISRS is {ISRS −2, ISRS −2+1, ISRS −2+3}, and all periodic offset information in the periodic offset set corresponds to the same period and different offsets. First time units (e.g., slots) occupied by the SRS corresponding to $I_{SRS}=2$ are shown in FIG. 11. Table 17 is just an example, and other occupation cases are not excluded in this embodiment.

TABLE 17

| Periodic Offset Index $I_{SRS}$ | SRS Period $T_{SRS}$ | SRS Offset $T_{offset}$ |
| --- | --- | --- |
| 0-1 | 2 | $I_{SRS}$ |
| 2-6 | 5 | $I_{SRS} - 2$, $I_{SRS} - 2 + 1$, $I_{SRS} - 2 + 3$ |
| 7-16 | 10 | $I_{SRS} - 7$ |
| 17-36 | 20 | $I_{SRS} - 17$ |
| 37-76 | 40 | $I_{SRS} - 37$ |

TABLE 17-continued

| Periodic Offset Index $I_{SRS}$ | SRS Period $T_{SRS}$ | SRS Offset $T_{offset}$ |
|---|---|---|
| 77-156 | 80 | $I_{SRS} - 77$ |
| 157-316 | 160 | $I_{SRS} - 157$ |
| 317-636 | 320 | $I_{SRS} - 317$ |
| 637-1023 | Reserved | Reserved |

Example Fifteen

In this embodiment, after an initial access, before a terminal has acquired RRC configuration signaling, an uplink signal and an uplink access signal have a same transmit beam.

The uplink signal includes at least one of a data channel (physical uplink shared channel (PUSCH)), an uplink control channel, an uplink resource request signal, or an uplink reference signal.

That is, by default, spatial filtering parameters of a DMRS of an uplink data channel (PUSCH) and a physical random access channel (PRACH) are quasi-co-located (QCL), and/or spatial filtering parameters of a DMRS of an uplink control channel (physical uplink control channel (PUCCH)) and the PRACH are QCL, spatial filtering parameters of the uplink resource request signal and the PRACH are QCL, and spatial filtering parameters of the uplink reference signal and the PRACH are QCL.

Example Sixteen

A first communication node indicates, via signaling, a time domain position used by a second communication node for transmitting an SRS, where the time domain position includes at least one of:

(1) a position of first N time domain symbols among symbols occupied by a slot or a physical uplink shared channel;

(2) a position of intermediate N time domain symbols among the symbols occupied by the slot or the physical uplink shared channel;

(3) a position of last N time domain symbols among the symbols occupied by the slot or the physical uplink shared channel;

(4) a position of N time domain symbols located before a time domain symbol position of an uplink demodulation reference signal; or (5) a position of N time domain symbols located before a time domain symbol position of the physical uplink shared channel.

N is an integer between 1 and 14, including 1 and 14.

Embodiment Five

Figure 12:
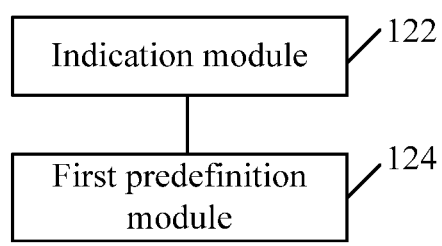
FIG. 12 is block diagram one of a reference signal configuration device according to an embodiment of the present disclosure.

Another embodiment of the present disclosure further provides a reference signal configuration device. FIG. 12 is block diagram one of a reference signal configuration device according to an embodiment of the present disclosure. As shown in FIG. 12, the device includes an indication module 122 or a first predefinition module 124.

The indication module 122 is configured to indicate, via signaling, a resource used by a second communication node for transmitting a reference signal.

The first predefinition module 124 is configured to predefine, with the second communication node, the resource used by the second communication node for transmitting the reference signal.

Embodiment Six

Figure 13:
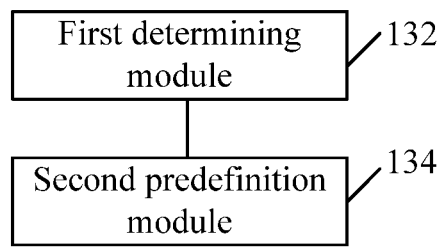
FIG. 13 is block diagram two of a reference signal configuration device according to an embodiment of the present disclosure.

Another embodiment of the present disclosure further provides a reference signal configuration device. FIG. 13 is block diagram two of a reference signal configuration device according to an embodiment of the present disclosure. As shown in FIG. 13, the device includes a first determining module 132 or a second predefinition module 134.

The first determining module 132 is configured to determine a resource used by a reference signal via signaling transmitted by a first communication node.

The second predefinition module 134 is configured to predefine, with the first communication node, the resource used for transmitting the reference signal.

Embodiment Seven

Figure 14:
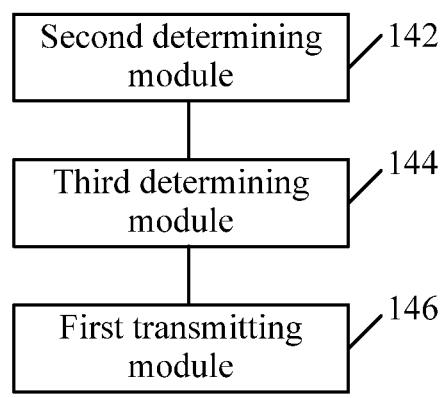
FIG. 14 is block diagram one of an information transmission device according to an embodiment of the present disclosure.

Another embodiment of the present disclosure further provides an information transmission device. FIG. 14 is block diagram one of an information transmission device according to an embodiment of the present disclosure. As shown in FIG. 14, the device includes a second determining module 142, a third determining module 144, and a first transmitting module 146.

The second determining module 142 is configured to determine first information.

The third determining module 144 is configured to determine resource request information of a first reference signal or capability information according to the first information.

The first transmitting module 146 is configured to transmit the resource request information of the first reference signal or the capability information.

The first information includes information about a second signal, and the first reference signal and the second signal have different transmission directions.

Embodiment Eight

Figure 15:
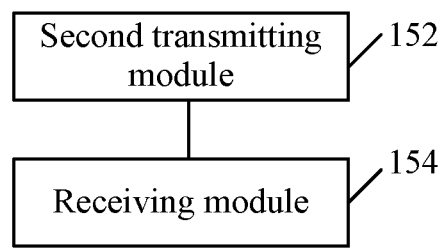
FIG. 15 is block diagram two of an information transmission device according to an embodiment of the present disclosure.

Another embodiment of the present disclosure further provides an information receiving device. FIG. 15 is block diagram two of an information transmission device according to an embodiment of the present disclosure. As shown in FIG. 15, the device includes a second transmitting module 152 and a receiving module 154.

The second transmitting module 152 is configured to transmit signaling information, where the signaling information is used for instructing a second communication node to transmit resource request information of a first reference signal or capability information.

The receiving module 154 is configured to receive the resource request information of the first reference signal or the capability information transmitted by the second communication node.

The signaling information carries first information, the first information includes information about a second signal, and the first reference signal and the second signal have different transmission directions.

Embodiment Nine

An embodiment of the present disclosure further provides a storage medium. The storage medium includes stored programs which, when executed, perform the method according to any one of the embodiments described above.

Optionally, in this embodiment, the storage medium may be configured to store program codes for performing a step described below.

In S11, a first communication node indicates, via signaling, a resource used by a second communication node for transmitting a reference signal.

Alternatively, in S12, the first communication node and the second communication node predefine the resource used by the second communication node for transmitting the reference signal.

Optionally, in this embodiment, the storage medium may be further configured to store program codes for performing a step described below.

In S21, a second communication node determines a resource used by a reference signal via signaling transmitted by a first communication node.

Alternatively, in S22, the second communication node and the first communication node predefine the resource used for transmitting the reference signal.

Optionally, in this embodiment, the storage medium may be further configured to store program codes for performing steps described below.

In S31, first information is determined.

In S32, resource request information of a first reference signal or capability information is determined according to the first information.

In S33, the resource request information of the first reference signal or the capability information is transmitted.

The first information includes information about a second signal, and the first reference signal and the second signal have different transmission directions.

Optionally, in this embodiment, the storage medium may be further configured to store program codes for performing steps described below.

In S41, signaling information is transmitted, where the signaling information is used for instructing a second communication node to transmit resource request information of a first reference signal or capability information.

In S42, the resource request information of the first reference signal or the capability information transmitted by the second communication node is received.

The signaling information carries first information, the first information includes information about a second signal, and the first reference signal and the second signal have different transmission directions.

Optionally, in this embodiment, the storage medium may include, but is not limited to, a USB flash disk, a read-only memory (ROM), a random access memory (RAM), a mobile hard disk, a magnetic disk, an optical disk or various other media capable of storing program codes.

Embodiment Ten

An embodiment of the present disclosure further provides a processor. The processor is configured to execute programs which, when executed, perform the steps of the method according to any one of the embodiments described above.

Optionally, in this embodiment, the programs are used for performing a step described below.

In S51, a first communication node indicates, via signaling, a resource used by a second communication node for transmitting a reference signal.

Alternatively, in S52, the first communication node and the second communication node predefine the resource used by the second communication node for transmitting the reference signal.

Optionally, in this embodiment, the programs are used for performing a step described below.

In S61, a second communication node determines a resource used by a reference signal via signaling transmitted by a first communication node.

Alternatively, in S62, the second communication node and the first communication node predefine the resource used for transmitting the reference signal.

Optionally, in this embodiment, the programs are used for performing steps described below.

In S71, first information is determined.

In S72, resource request information of a first reference signal or capability information is determined according to the first information.

In S73, the resource request information of the first reference signal or the capability information is transmitted.

The first information includes information about a second signal, and the first reference signal and the second signal have different transmission directions.

Optionally, in this embodiment, the programs are used for performing steps described below.

In S81, signaling information is transmitted, where the signaling information is used for instructing a second communication node to transmit resource request information of a first reference signal or capability information.

In S82, the resource request information of the first reference signal or the capability information transmitted by the second communication node is received.

The signaling information carries first information, the first information includes information about a second signal, and the first reference signal and the second signal have different transmission directions.

Optionally, for specific examples in this embodiment, reference may be made to the examples described in the above-mentioned embodiments and optional embodiments, and repetition will not be made in this embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of two computing devices, and optionally, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or two modules or steps therein may be made into a single integrated circuit module for implementation. In this way, the present disclosure is not limited to any specific combination of hardware and software.

The above are only preferred embodiments of the present disclosure and not intended to limit the present disclosure. For those skilled in the art, the present disclosure may have various modifications or changes. Any modifications, equivalent substitutions, improvements, and the like made within the spirit of the present disclosure should fall within the scope of the present disclosure.

What is claimed is:

1. A reference signal configuration method, comprising:
indicating, by a first communication node via signaling, a resource used by a second communication node for transmitting a reference signal; or
predefining, by a first communication node and a second communication node, a resource used by the second communication node for transmitting a reference signal;
wherein one or more resources constitute a resource group, wherein transmission bandwidth sets of the reference signal corresponding to different resource groups are different, or transmission bandwidth sets of the reference signal corresponding to different resources are different; and
wherein
information about a multi-level bandwidth structure of the reference signal is associated with an uplink transmission bandwidth corresponding to the second communication node,
wherein a transmission bandwidth is in the uplink transmission bandwidth;
the resource group of the reference signal is associated with an uplink transmission bandwidth;
resource configuration information of the reference signal carries information about one or more multi-level bandwidth structures;
configuration information of the resource group of the reference signal carries information about one or more multi-level bandwidth structures; or
configuration information of the resource group of the reference signal carries selection information of multi-level bandwidth structures;
wherein the transmission bandwidth of the reference signal belongs to a bandwidth included in one multi-level bandwidth structure, one bandwidth at an n-th level of the multi-level bandwidth structure comprises one or more bandwidths at an (n+1)-th level, the resource group of the reference signal comprises the one or more resources of the reference signal, and the selection information of multi-level bandwidth structures indicates that one or more multi-level bandwidth structures are selected from more than one predetermined multi-level bandwidth structure.

2. The method of claim 1, wherein the resource comprises at least one of a frequency domain starting position, a transmission bandwidth, a bandwidth configuration, or a time domain position.

3. The method of claim 2, wherein predefining, by the first communication node and the second communication node, the resource used by the second communication node for transmitting the reference signal comprises:
determining, by the first communication node, a transmission bandwidth set of the reference signal according to a range of a bandwidth part configured for the second communication node;
determining, by the first communication node, the bandwidth configuration of the reference signal according to a range of a bandwidth part configured for the second communication node;
determining, by the first communication node, a transmission bandwidth range or a transmission bandwidth set of the reference signal according to the bandwidth configuration of the reference signal; or
determining, by the first communication node, the transmission bandwidth of the reference signal according to a parameter of the transmission bandwidth of the reference signal configured for the second communication node; and
wherein under a condition that a value of the bandwidth part increases, a transmission bandwidth set of the reference signal corresponding to a value of a bandwidth part at a current level is a subset of a transmission bandwidth set of the reference signal corresponding to a value of a bandwidth part at a next level.

4. The method of claim 2, wherein the time domain position comprises at least one of:
a position of first N time domain symbols among symbols occupied by a slot or a physical uplink shared channel;
a position of intermediate N time domain symbols among symbols occupied by a slot or a physical uplink shared channel;
a position of last N time domain symbols among symbols occupied by a slot or a physical uplink shared channel;
a position of N time domain symbols located before a time domain symbol position of an uplink demodulation reference signal; or
a position of N time domain symbols located before a time domain symbol position of a physical uplink shared channel;
wherein N is an integer greater than or equal to 1 and less than or equal to 14.

5. The method of claim 1, wherein a value of the transmission bandwidth comprises at least one of 272, 256, 240, 216, 192, 180, 176, 168, 160, 152, 144, 140, 136, 128, 120, 108, 100, 96, 80, 72, 64, 60, 48, 40, 36, 32, 24, 20, 16, 12, 8, or 4.

6. The method of claim 1, wherein
configuration information of uplink transmission bandwidth information carries the information about one or more multi-level bandwidth structures;
a plurality of uplink transmission bandwidths shares information about the multi-level bandwidth structure of the reference signal;
configuration information of uplink transmission bandwidth information carries the configuration information of the resource group of the reference signal;
the resource configuration information of the reference signal carries the uplink transmission bandwidth information;
the configuration information of the resource group of the reference signal carries the uplink transmission bandwidth information;
the more than one predetermined multi-level bandwidth structure is determined according to the uplink transmission bandwidth information; or
the more than one predetermined multi-level bandwidth structure is determined according to a resource group, where the resource of the reference signal is located, of the reference signal.

7. The method of claim 1, wherein
the signaling comprises the information about the multi-level bandwidth structure, wherein the information about the multi-level bandwidth structure comprises at least one of: a number M of levels, a number of bandwidths at an (n+1)-th level included in one bandwidth at an n-th level, selection information of multi-level bandwidth structures, a bandwidth length of a minimum bandwidth, a bandwidth length corresponding to one bandwidth at a j-th level, a total number of bandwidths at an m-th level, or a number of multi-level bandwidth structures, where n belongs to $\{0, 1, \ldots, M-2\}$, m belongs to $\{1, 2, \ldots, M-1\}$, j belongs to $\{0,$ 1, ..., M−1}, and M is a natural number and is the number of levels of the multi-level bandwidth structure; and a transmission bandwidth of the reference signal belongs to a bandwidth included in one multi-level bandwidth structure, one bandwidth at the n-th level of the multi-level bandwidth structure comprises one or more bandwidths at the (n+1)-th level, and the selection information of multi-level bandwidth structures indicates that one or more multi-level bandwidth structures are selected from a plurality of predetermined multi-level bandwidth structures.

8. The method of claim 1, wherein indicating, by the first communication node via the signaling, the resource used by the second communication node for transmitting the reference signal comprises:

determining, by the first communication node, a signaling configuration manner of a transmission bandwidth of the reference signal according to whether frequency hopping is performed on the reference signal; wherein in response to determining that the reference signal is in a frequency hopping mode, configuration information of the transmission bandwidth of the reference signal comprises information about a multi-level bandwidth structure; or in response to determining that the reference signal is in a non-frequency hopping mode, the configuration information of the transmission bandwidth of the reference signal does not comprise information about a multi-level bandwidth structure and comprises length information of the transmission bandwidth.

9. The method of claim 1, wherein the signaling comprises a time domain position, and the time domain position comprises at least one of the following:

information about a periodic offset set, wherein the periodic offset set comprises at least one periodic offset; or P pieces of periodic offset information, wherein each of the P pieces of periodic offset information corresponds to Q pieces of offset information, where P is a natural number, Q is an integer, and the periodic offset information carries periodic information and offset information.

10. The method of claim 9, wherein the method satisfies at least one of the following:

the periodic offset set comprises two types of periodic offsets: an absolute periodic offset and a relative periodic offset;

period information corresponding to the Q pieces of offset information is obtained according to periodic offset information corresponding to the Q pieces of offset information;

each of the Q pieces of offset information corresponds to one piece of information about a number of time domain symbols, wherein the number of time domain symbols indicates a number of time domain symbols occupied by the reference signal in a first time unit indicated by the offset information;

each of the Q pieces of offset information corresponds to one piece of time domain symbol position information, wherein the time domain symbol position information indicates a time domain position occupied by the reference signal in a first time unit indicated by the offset information;

each periodic offset in the periodic offset set corresponds to one piece of information about a number of time domain symbols, wherein the number of time domain symbols indicates a number of time domain symbols occupied by the reference signal in a first time unit indicated by the periodic offset information;

each periodic offset in the periodic offset set corresponds to the one piece of time domain symbol position information, wherein the time domain symbol position information indicates a time domain symbol position occupied by the reference signal in a first time unit indicated by the periodic offset information;

the information about the periodic offset set corresponds to one piece of index indication information; or the time domain position is related to one resource of the reference signal.

11. A reference signal configuration method, comprising:

determining, by a second communication node, a resource used by a reference signal via signaling transmitted by a first communication node; or predefining, by a second communication node and a first communication node, a resource used by the second communication node for transmitting a reference signal; and wherein the signaling comprises information about multi-level bandwidth structure, where the information about the multi-level bandwidth structure comprises at least one of: a number M of levels, a number of bandwidths at an (n+1)-th level included in one bandwidth at an n-th level, selection information of multi-level bandwidth structures, a bandwidth length of a minimum bandwidth, a bandwidth length corresponding to one bandwidth at a j-th level, a total number of bandwidths at an m-th level, or a number of multi-level bandwidth structures, where n belongs to {0, 1, ..., M−2}, m belongs to {1, 2, ..., M−1}, j belongs to {0, 1, ..., M−1}, and M is a natural number and is the number of levels of the multi-level bandwidth structure; and a transmission bandwidth of the reference signal is a bandwidth included in the multi-level bandwidth structure, one bandwidth at the n-th level of the multi-level bandwidth structure comprises one or more bandwidths at the (n+1)-th level, and the selection information of multi-level bandwidth structures indicates that one or more multi-level bandwidth structures are selected from a plurality of predetermined multi-level bandwidth structures.

12. The method of claim 11, wherein the resource comprises at least one of a frequency domain starting position, a transmission bandwidth, a bandwidth configuration, or a time domain position; and wherein predefining, by the second communication node and the first communication node, the resource used by the second communication node for transmitting the reference signal comprises:

determining, by the second communication node, a transmission bandwidth set of the reference signal according to a range of a bandwidth part configured by the first communication node;

determining, by the second communication node, the bandwidth configuration of the reference signal according to a range of a bandwidth part configured by the first communication node;

determining, by the second communication node, a transmission bandwidth range or a transmission bandwidth set of the reference signal according to the bandwidth configuration of the reference signal; or determining, by the second communication node, the transmission bandwidth of the reference signal according to a parameter of the transmission bandwidth of the reference signal configured by the first communication node.

13. The method of claim 11, wherein one or more resources constitute a resource group, wherein transmission bandwidth sets of the reference signal corresponding to different resource groups are different, or different transmission bandwidth sets of the reference signal corresponding to different resources are different.

14. The method of claim 13, wherein the information about the multi-level bandwidth structure of the reference signal is associated with an uplink transmission bandwidth corresponding to the second communication node, wherein a transmission bandwidth is in the uplink transmission bandwidth;

the resource group of the reference signal is associated with an uplink transmission bandwidth;

resource configuration information of the reference signal carries information about one or more multi-level bandwidth structures;

configuration information of the resource group of the reference signal carries information about one or more multi-level bandwidth structures; or configuration information of the resource group of the reference signal carries selection information of multi-level bandwidth structures;

wherein the transmission bandwidth of the reference signal belongs to a bandwidth included in one multi-level bandwidth structure, one bandwidth at an n-th level of the multi-level bandwidth structure comprises one or more bandwidths at an (n+1)-th level, the resource group of the reference signal comprises the one or more resources of the reference signal, and the selection information of multi-level bandwidth structures indicates that one or more multi-level bandwidth structures are selected from more than one predetermined multi-level bandwidth structure.

15. A reference signal configuration device, comprising a processor and a storage medium for storing a program, wherein the program, when executed by the processor, performs the steps according to claim 1.

* * * * *